US008513565B2

(12) United States Patent
Duan

(10) Patent No.: US 8,513,565 B2

(45) Date of Patent: Aug. 20, 2013

(54) NOZZLE HEAD WITH INCREASED SHOULDER THICKNESS

(75) Inventor: Zheng Duan, Hanover, NH (US)

(73) Assignee: Hypertherm, Inc., Hanover, NH (US)

(*) Notice: Subject to any disclaimer, the term of this patent is extended or adjusted under 35 U.S.C. 154(b) by 1514 days.

(21) Appl. No.: 12/101,086

(22) Filed: Apr. 10, 2008

(65) Prior Publication Data

US 2009/0255909 A1 Oct. 15, 2009

(51) Int. Cl.
*B23K 10/00* (2006.01)

(52) U.S. Cl.
USPC .............. 219/121.5; 219/121.48; 219/121.52; 219/75; 313/231.51

(58) Field of Classification Search
CPC ........................................................ B23K 10/00
USPC .............. 219/121.39, 121.44, 121.5, 121.51, 219/121.48, 74, 75; 313/231.41, 231.51
See application file for complete search history.

(56) References Cited

U.S. PATENT DOCUMENTS

| | | | | |
|---|---|---|---|---|
| 4,855,563 | A | 8/1989 | Beresnev et al. | |
| 5,164,568 | A * | 11/1992 | Sanders | 219/121.5 |
| 5,208,448 | A | 5/1993 | Everett | |
| 5,695,662 | A * | 12/1997 | Couch et al. | 219/121.39 |
| 6,069,339 | A | 5/2000 | McGrath et al. | |
| 6,096,992 | A * | 8/2000 | Severance, Jr. | 219/121.5 |
| 6,268,583 | B1 | 7/2001 | Yamaguchi et al. | |
| 6,403,915 | B1 | 6/2002 | Cook et al. | |
| 2005/0082263 | A1 | 4/2005 | Koike et al. | |
| 2005/0133484 | A1 * | 6/2005 | Delzenne | 219/121.5 |
| 2006/0289398 | A1 * | 12/2006 | Cook et al. | 219/121.5 |
| 2007/0007256 | A1 * | 1/2007 | Duan et al. | 219/121.5 |
| 2008/0083708 | A1 | 4/2008 | Hussary et al. | 219/121.5 |

FOREIGN PATENT DOCUMENTS

| | | |
|---|---|---|
| EP | 1 893 004 | 2/2008 |
| WO | 2007/129194 | 11/2007 |

* cited by examiner

*Primary Examiner* — Mark Paschall

(74) *Attorney, Agent, or Firm* — Proskauer Rose LLP

(57) ABSTRACT

A consumable for a plasma arc torch, such as a nozzle, having a body and a head defining a shoulder portion having a frusto-conical portion and a flared portion. The flared portion increases the cross-sectional thickness to provide a greater heat-conduction path for removal of heat generated by a plasma arc, thereby extending consumable life. The frusto-conical portion provides a sharper, pointier nozzle head to simultaneously increase the operator's visibility of the work-piece. Methods of making and using the consumables are also included.

60 Claims, 26 Drawing Sheets

NOZZLE HEAD WITH INCREASED SHOULDER THICKNESS

FIELD OF THE INVENTION

This invention relates generally to gas-cooled plasma arc cutting torches, and more particularly to extending the working life of nozzles for gas-cooled torches with an increased shoulder thickness to decrease the thermal wear rate.

BACKGROUND

Welding and plasma arc torches are widely used in the welding, cutting and marking of materials. A plasma torch generally includes an electrode and a nozzle having a central exit orifice mounted within a torch body, electrical connections, passages for cooling, passages for arc control fluids (e.g., plasma gas), and a power supply. Optionally, a swirl ring is employed to control fluid flow patterns in the plasma chamber formed between the electrode and nozzle. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or any of a variety of contact starting methods.

During operation of the torch, certain consumable parts become worn and have to be replaced. A known problem in the art is increasing the lifespan of consumables. Specifically, these consumables include torch electrodes, nozzles, and shields. Previous patents assigned to Hypertherm, Inc. of Hanover, N.H. teach techniques for prolonging the lifespan of some of these consumables. For example, U.S. Pat. No. 5,317,126, the contents of which are incorporated herein by reference in their entirety, teaches that the life of a nozzle and an electrode can be extended by providing a plasma bypass channel to increase the mass flow rate of the plasma gas through the plasma chamber. U.S. Pat. No. 5,166,494, the contents of which are incorporated herein by reference, describes altering the flow of plasma gas in conjunction with the transfer of the current flow from the nozzle to the workpiece, and U.S. Pat. No. 5,170,033, the contents of which are incorporated herein by reference in their entirety, teaches that a chamber in the swirl ring can be created and sized to favorably affect the dynamic flow characteristics of the flowing gas when torch operating conditions are changed.

Another known problem in the art of gas-cooled plasma arc cutting torches is increasing the line of site from an operator to a workpiece, particularly along the torch head. A limitation to the sharpness of the torch head is the need to include various design parameters and electrical circuitry therein.

SUMMARY OF THE INVENTION

An aspect of the invention decreases the thermal wear rate of nozzles. One reason for the increased thermal wear rate relates to the minimum cross-sectional thickness of the shoulder region on the nozzle head. Previous designs do not provide a sufficient heat-conduction path for the heat generated by the plasma arc. It was also discovered that the thermal wear rate of the nozzle can increase as the length to width ratio (i.e., pointiness) of the nozzle head increases. Moreover, by simultaneously providing a sharper, pointier nozzle head, the operator's visibility of the workpiece can be increased.

The invention overcomes these and other problems by using a flared shoulder portion that provides an increased cross-sectional thickness of the shoulder, thereby providing a greater heat-conduction path for the heat generated by the plasma arc. In addition, the flared shoulder portion allows the nozzle head to have a substantially non-conical shoulder, thereby providing a torch operator with a better line of site to the workpiece.

A first aspect of the invention includes a nozzle for a gas-cooled plasma arc cutting torch. The nozzle includes a body comprising a hollow interior having a cylindrical portion that defines a central longitudinal axis and an inside diameter and a nozzle head. The nozzle head defines a plasma exit orifice disposed about the central longitudinal axis and a shoulder portion comprising a generally non-cylindrical portion and a second portion that, in combination, define an external contoured surface, the second portion disposed between the generally non-cylindrical portion and the body.

In an embodiment, the nozzle includes a contour line disposed on the external contoured surface identifies a region of a minimum shoulder thickness. The contour line can be disposed between the generally non-cylindrical portion and the second portion. In some embodiments, the second portion is disposed between the contour line and a second region on the body that identifies the intersection of the body and shoulder portion. The external contoured surface of the shoulder portion can define at least one of a nonlinear or irregular surface.

The generally non-cylindrical portion can be disposed nearer the longitudinal axis than is the inside diameter of the body. In some embodiments, substantially all of the generally non-cylindrical portion is between an end face of the nozzle head and a point on the nozzle body that corresponds to an insert depth (e.g., blowback position) of the electrode. In an embodiment, substantially all of the generally non-cylindrical portion is between an end face of the nozzle head and a bottom interior surface of the nozzle head.

The nozzle can be defined by a second angle measured between the longitudinal axis and a second tangent line to a second exterior surface of the second portion. The second angle can be greater than a first angle measured between the longitudinal axis and a first tangent line to a first exterior surface of the generally non-cylindrical portion. In some embodiments, the second portion is disposed between the generally non-cylindrical portion and a reference point located by extending the first tangent line to an exterior surface of the nozzle body. In an embodiment, the second tangent line passes through the second portion at a point of the nozzle head furthest from the longitudinal axis. In a preferred embodiment, the second angle is approximately 90 degrees. The second tangent line can substantially parallel the second exterior surface. The first tangent line can substantially parallel the first exterior surface.

In some embodiments, the region of minimum shoulder thickness corresponds to a heat transfer density proportionate to not more than about 2 amperes of torch operating current per square millimeter of nozzle cross-sectional conduction area at the region of minimum shoulder thickness. In a preferred embodiment, at least one of the generally non-cylindrical portion or the second portion is at least substantially conical. The external contoured In some embodiments, the contour line is between the generally non-cylindrical portion and a point on the nozzle body that corresponds to an insert depth (e.g., blowback position) of the electrode. The contour line can be between the generally non-cylindrical portion and a bottom interior surface of the nozzle head. In an embodiment, the generally non-cylindrical portion and the second portion are at least substantially contiguous.

In another aspect of the invention, a nozzle for a gas-cooled plasma arc cutting torch is provided. The nozzle includes a body and a nozzle head. The body comprises a hollow interior having a cylindrical portion that defines a central longitudinal axis, an inside diameter, and an external body surface. The nozzle head defines a plasma exit orifice disposed about the central longitudinal axis and a shoulder portion defining an external contoured surface. A first section and a second section of the shoulder portion is disposed within a cross section of the shoulder portion that passes through the central longitudinal axis. The first section has a first external contour disposed between an end face of the nozzle head and an external surface of the nozzle body. The second section has a second external shoulder contour disposed between the external surface of the nozzle body and the first external contour, such that an angle ϕ1 measured between the central longitudinal axis and a first tangent line to a first point on the first external contour is less than an angle ϕ2 measured between the central longitudinal axis and a second tangent line to a second point on the second shoulder contour.

In an embodiment, a contour point correlates to a region of cross-sectional minimum shoulder thickness. The region of cross-sectional minimum shoulder thickness is identified at a location between the first external contour and the second external contour. In some embodiments, the contour point is disposed between the first external contour and a second region on the body that identifies the intersection of the body and shoulder portion.

The external contoured surface of the shoulder can define a nonlinear or irregular surface. In an embodiment, the second tangent line passes through the second section at a point of the nozzle head furthest from the longitudinal axis. In a preferred embodiment, ϕ2 is approximately 90 degrees. In some embodiments, the first and second sections of the shoulder are at least substantially conical.

The first and second sections can be at least substantially contiguous. In an embodiment, the first tangent line substantially parallels the first external contour. The second tangent line can substantially parallel the second external contour.

An aspect of the invention includes a nozzle for a gas-cooled plasma arc cutting torch. The nozzle comprises a body and a nozzle head. The body comprises a hollow interior having a cylindrical portion that defines a central longitudinal axis and an inside diameter. The nozzle head defines a plasma exit orifice disposed about the central longitudinal axis and a shoulder portion between an end face of the nozzle head and the body. The shoulder portion comprises an at least substantially frusto-conical portion and a flared portion that, in combination, define an external contoured surface of the shoulder portion. At least a portion of the frusto-conical portion is disposed between an end face of the nozzle head and the flared portion, and the flared portion is disposed between the nozzle body and the frusto-conical portion.

In an embodiment, a contour line is disposed on the external contoured surface that identifies a region of a minimum shoulder thickness. The contour line can be disposed at the intersection of the frusto-conical portion and the flared portion. In some embodiments, the contour line is disposed between the end face of the nozzle head and a point on the nozzle body that corresponds to an insert depth (e.g., blow-back position) of the electrode. The exterior surface of the flared portion can form a substantial portion of the external contoured surface. In some embodiments, the external contoured surface of the shoulder portion includes at least one of an irregular or non-linear cross-sectional shape. The contour line can be disposed nearer the longitudinal axis than is the inside diameter of the body.

A second angle measured between the central longitudinal axis and a second tangent line to an outermost exterior surface of the nozzle head can be greater than a first angle measured between the central longitudinal axis and a first tangent line to a point on the shoulder that corresponds to the contour line. In an embodiment, the second angle is approximately 90 degrees. The first tangent line can substantially parallel a first exterior surface of the shoulder. The second tangent line can substantially parallel the outermost exterior surface of the nozzle head.

In some embodiments, the region of minimum shoulder thickness corresponds to a heat transfer density proportionate to not more than about 2 amperes of torch operating current per square millimeter of nozzle cross-sectional conduction area at the region of minimum shoulder thickness. In an embodiment, the flared portion is at least substantially conical.

An aspect of the invention includes a torch tip comprising a nozzle and a shield. The nozzle comprises a nozzle body and a nozzle head. The nozzle body comprises a hollow interior having a cylindrical portion that defines a central longitudinal axis and an inside diameter. The nozzle head defines a plasma exit orifice disposed about the central longitudinal axis and a nozzle shoulder portion. The nozzle shoulder portion comprises a first generally non-cylindrical portion and a second nozzle portion that, in combination, define an external contoured surface, the second nozzle portion disposed between the first generally non-cylindrical shoulder portion and the nozzle body.

The shield comprises a shield body and a shield head. The shield body includes a fastener for securing the shield to the torch body in a spaced relationship relative to the nozzle, for routing a shield gas through a space between the shield body and the nozzle. The shield head defines a shield head, which defines a shield exit orifice disposed about the central longitudinal axis and a shield shoulder portion. The shield shoulder portion comprising a second generally non-cylindrical portion and a second shield portion that, in combination, define an internal contoured surface. The second shield portion is disposed between the second generally non-cylindrical portion and the body, the second generally non-cylindrical and second shield portions corresponding to the first generally non-cylindrical and second nozzle portions.

In some embodiments, a second angle measured between the longitudinal axis and a second tangent line to a second external surface of the second nozzle portion is greater than a first angle measured between the longitudinal axis and a first tangent line to a first external surface of the first generally non-cylindrical portion. In an embodiment, the second angle is approximately 90 degrees. In some embodiments, the first tangent line at least substantially parallels the first external surface. The second tangent line can be at least substantially parallels the second external surface.

The first generally non-cylindrical portion and the second nozzle portion can be substantially conical. In an embodiment, the generally non-cylindrical portion and the second nozzle portion are at least substantially contiguous.

Another aspect of the invention includes a gas-cooled plasma arc cutting torch comprising a torch body, an electrode disposed within a swirl ring in the torch body, a nozzle, and a shield. The nozzle comprises a nozzle body and a nozzle head. The nozzle body comprises a hollow interior having a cylindrical portion that defines a central longitudinal axis and an inside diameter. The nozzle head defines a plasma exit orifice disposed about the central longitudinal axis and a nozzle shoulder portion. The nozzle shoulder portion comprises a first generally non-cylindrical portion and a second nozzle portion that, in combination, define an external contoured surface, the second nozzle portion disposed between the first generally non-cylindrical shoulder portion and the nozzle body.

The shield comprises a shield body and a shield head. The shield body includes a fastener for securing the shield to the torch body in a spaced relationship relative to the nozzle, for routing a shield gas through a space between the shield body and the nozzle. The shield head defines a shield exit orifice disposed about the central longitudinal axis and a shield shoulder portion. The shield shoulder portion comprises a second generally non-cylindrical portion and a second shield portion that, in combination, define an internal contoured surface. The second shield portion is disposed between the second generally non-cylindrical portion and the body, the second generally non-cylindrical and second shield portions corresponding to the first generally non-cylindrical and second nozzle portions.

A second angle measured between the longitudinal axis and a second tangent line to a second external surface of the second nozzle portion can be greater than a first angle measured between the longitudinal axis and a first tangent line to a first external surface of the first generally non-cylindrical portion. In some embodiments, the second angle is approximately 90 degrees. The first tangent line can at least substantially parallel the first external surface. In an embodiment, the second tangent line can at least substantially parallel the second external surface.

In some embodiments, the first generally non-cylindrical portion and the second nozzle portion are at least substantially conical. In an embodiment, the first generally non-cylindrical portion and the second nozzle portion are at least substantially contiguous.

An aspect of the invention includes a shield for a gas-cooled plasma arc cutting torch. The shield comprises a body and a head. The body includes a fastener for securing the shield to the body of the torch in a spaced relationship relative to a nozzle, the body having a cylindrical portion that defines a central longitudinal axis. The head defines an exit orifice disposed about the central longitudinal axis and a shoulder portion defining an internal contoured surface. The shoulder portion has a first section and a second section in a cross section disposed within a cross section of the shoulder portion that passes through the central longitudinal axis. The first section has a first internal contour disposed between an end face of the shield head and an internal surface of the shield body, the second section has a second internal contour disposed between the internal surface of the shield body and the first internal contour. An angle $\alpha\mathbf{1}$ measured between the central longitudinal axis and a first tangent line to a first point on the first internal contour is less than an angle $\alpha\mathbf{2}$ measured between the central longitudinal axis and a second tangent line to a second point on the second internal contour.

In some embodiments, the angle $\alpha\mathbf{2}$ approximately equals 90 degrees. The first and second shield sections can be at least substantially conical.

Another aspect of the invention comprises a method for increasing the life of a nozzle. The method comprises the step of providing a nozzle having a body and a nozzle head, the nozzle head defining an at least substantially frusto-conical shoulder portion such that a first nozzle wear rate results. The method further includes defining a flared shoulder portion that, in combination with the at least substantially frusto-conical shoulder portion, defines a nozzle shoulder having an external contoured surface. At least a portion of the frusto-conical surface is disposed between an end face of a nozzle head and the flared portion, and the flared portion is disposed between the body and the frusto-conical portion, such that a second nozzle wear rate results, the second nozzle wear rate less than the first nozzle wear rate.

In some embodiments, the method includes the step of forming the flared shoulder portion such that a second angle measured between the central longitudinal axis and a second tangent line to an outermost exterior surface of the nozzle head is greater than a first angle measured between the central longitudinal axis and a first tangent line to a point on the shoulder that corresponds to the contour line. In an embodiment, the method includes defining the second angle to be approximately 90 degrees.

The method can include establishing a contour line on the external contoured surface that identifies a region of a minimum shoulder thickness between the generally non-cylindrical portion and the second portion. In an embodiment, the method includes positioning the contour line to be at the intersection of the frusto-conical portion and the flared portion. In some embodiments, the method includes disposing the contour line nearer the longitudinal axis than an inside diameter of the body.

The method can include the step of defining the external contoured surface with an irregular or non-linear cross-sectional shape. In some embodiments, the method includes defining the flared portion as substantially conical. In an embodiment, the method includes establishing the region of minimum shoulder thickness to with at least a minimum thickness to correspond to a heat transfer density proportionate to not more than about 2 amperes of torch operating current per square millimeter of nozzle cross-sectional conduction area at the region of minimum shoulder thickness.

An aspect of the invention includes a method of manufacturing a nozzle. The method comprises providing a nozzle having an at least substantially cylindrical body and a substantially cylindrical nozzle head disposed about a central longitudinal axis. The method further includes removing a section of the nozzle head to define a shoulder portion between an end face of the nozzle head and the body. The shoulder portion produced thereby comprises a generally non-cylindrical portion and a second portion that, in combination, define an external contoured surface between the generally non-cylindrical portion and the body.

In some embodiments, the method includes establishing a region of minimum thickness between the generally non-cylindrical portion and the second portion such that the shoulder region has a contour line that identifies the region of minimum shoulder thickness. The method can include defining the second angle to be approximately 90 degrees. In an embodiment, the generally non-cylindrical portion and the second portion are substantially conical.

In some embodiments, the method includes a step of establishing the contour line nearer the longitudinal axis than an inside diameter of the body. In an embodiment, the method includes, during the removing step, defining the generally non-cylindrical portion and second portion such that a second angle measured between the longitudinal axis and a second tangent line to a second exterior surface of the second portion is greater than a first angle measured between the longitudinal axis and a first tangent line to a first exterior surface of the generally non-cylindrical portion. The method can include disposing the second portion between the generally non-cylindrical portion and a reference point located by extending the first tangent line to an exterior surface of the nozzle body.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
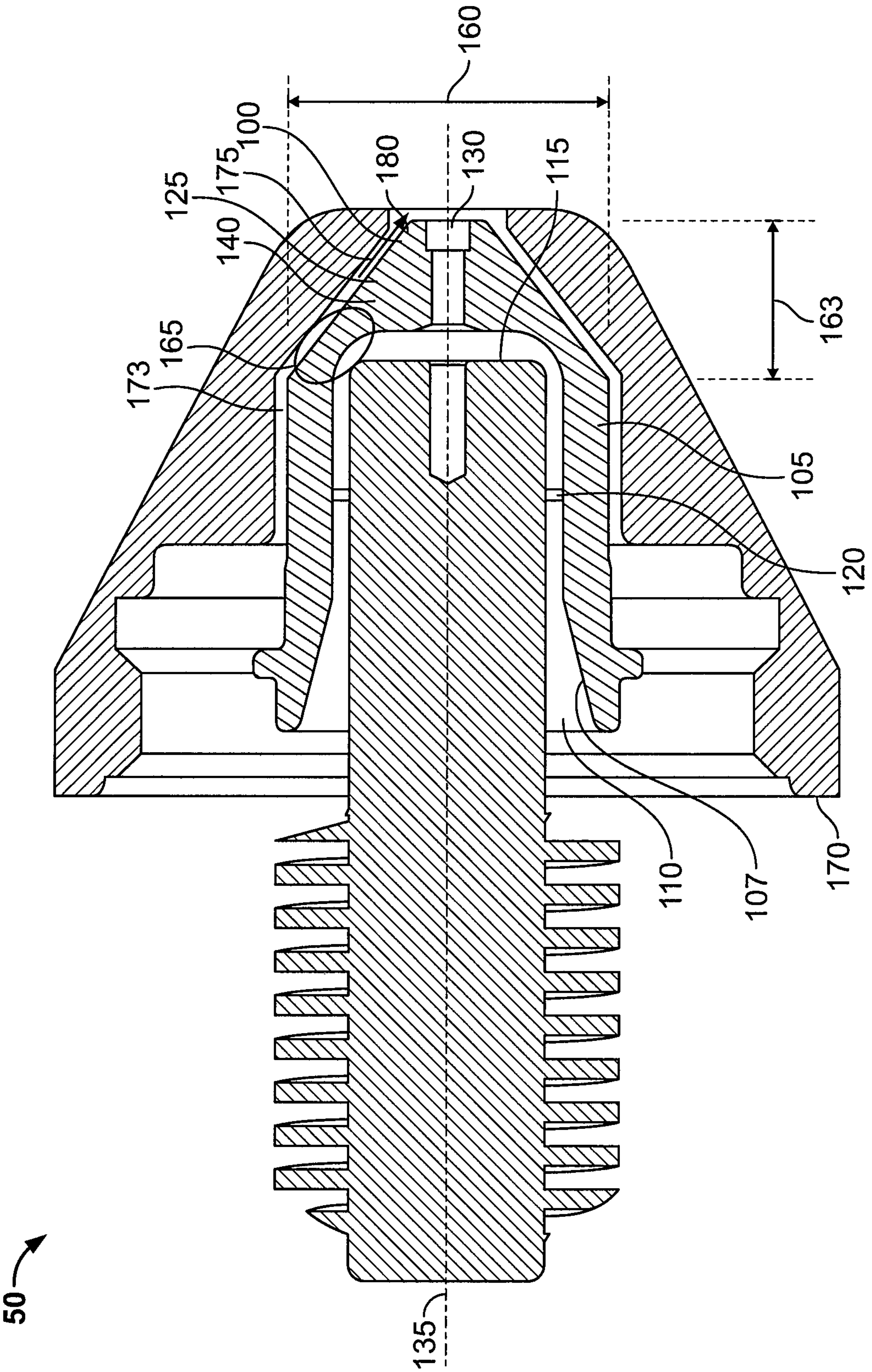
FIG. 1 is a cross-sectional view of a known gas-cooled nozzle.

FIG. 1 illustrates a simplified view of a known gas-cooled torch tip 50. The nozzle 100 includes a substantially cylindrical body 105 having a hollow interior 110 to receive an electrode 115. A swirl ring 120 can be disposed between the electrode 115 and an interior edge 107 of the body 105. A nozzle head 125 is integrally connected to the body 105. The nozzle head 125 includes a shoulder 140 and an exit orifice 130 disposed about a central longitudinal axis 135.

A shield 170 can be disposed in a spatial relationship with the nozzle 100. The shield 170 defines a channel 173 for flowing a shield gas 175 to cool the nozzle 100 and to minimize material spatter on the nozzle tip 180.

It was discovered that for a given torch operating current, as the diameter 160 of the nozzle head 125 is decreased, the nozzle 100 lifespan decreases. It was also discovered that as the length 163 to diameter 160 ratio (i.e., the pointiness) of the nozzle head 125 increases, the nozzle 100 lifespan decreases. The nozzle 100 lifespan decrease seems to occur due to thermal wear, as the minimum cross-sectional thickness 165 of the nozzle head 140 does not provide a sufficient heat conducting path to remove the heat generated by the plasma arc near the tip 180 of the nozzle head 125.

Figure 2A:
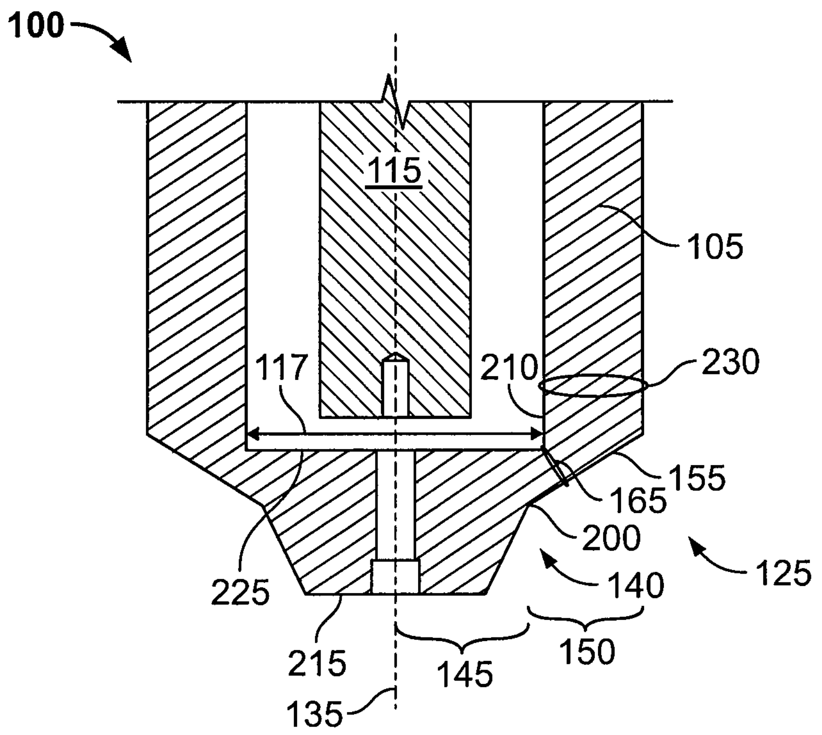
FIGS. 2A-B are simplified cross-sectional views of a gas-cooled nozzle according to an aspect of the invention.

FIG. 2A is a simplified cross-sectional view of a gas-cooled nozzle 100 according to an aspect of the invention. In some embodiments, the shoulder 140 includes a generally non-cylindrical portion 145 and a second portion 150. The second portion 150 is disposed between the generally non-cylindrical portion 145 and the body 105. The second portion 150 increases the minimum cross-sectional thickness 165 of the shoulder 140, thereby increasing the minimum cross-sectional area of the heat conducting path, enhancing heat removal capacity and increasing the working life of the nozzle 100. The generally non-cylindrical portion 145 and the second portion 150 can, in combination, define an external contoured surface 155. In some embodiments, e.g., as discussed below, the external surface 155 is nonlinear or irregular.

The generally non-cylindrical portion 145 and the second portion 150 can be at least substantially contiguous. In some embodiments, such as the embodiment depicted in FIG. 2A, the generally non-cylindrical portion 145 and the second portion 150 are at least substantially conical. FIG. 2A depicts that the generally non-cylindrical portion 145 can be disposed nearer the longitudinal axis 135 than the inside diameter 117 of the body 105. A contour line 200 disposed on the external contoured surface 155 can identify a region of minimal cross-sectional thickness 165. In an embodiment, the contour line 200 is disposed between the generally non-cylindrical portion 145 and the second portion 150. In some embodiments, the second portion 150 is disposed between the contour line 200 and a second region 230 on the body 105 that identifies the intersection of the body 105 and shoulder 140. In some embodiments, the minimal cross-sectional thickness 165 corresponds to a heat transfer density proportionate to not more than about 45 amperes of torch operating current per 24 square millimeters of nozzle 100 cross-sectional conduction area, i.e., a heat conduction transfer rate that corresponds to less than about 2 amps of torch operating current per square millimeter of minimum nozzle heat conduction area at the region of minimum shoulder thickness. Still referring to FIG. 2A, substantially all of the generally non-cylindrical portion 145 can be disposed between the end face 215 of the nozzle head 125 and a bottom interior surface 225 of the body 105.

In some embodiments, substantially all of the generally non-cylindrical portion 145 is disposed between an end face 215 of the nozzle head 125 and a point 210 on the nozzle body 105 that corresponds to an insert depth of the electrode 115 when the electrode 115 is in a blowback position. U.S. Pat. Nos. 4,791,268 and 4,902,871, the contents of which are incorporated herein by reference in their entirety, teach that a plasma can be ignited by contact starting. An electrode can be in a first position, close to the nozzle head, to start the plasma, and then slide backwards to a blowback position due to gas pressure buildup at the nozzle head.

Figure 2B:
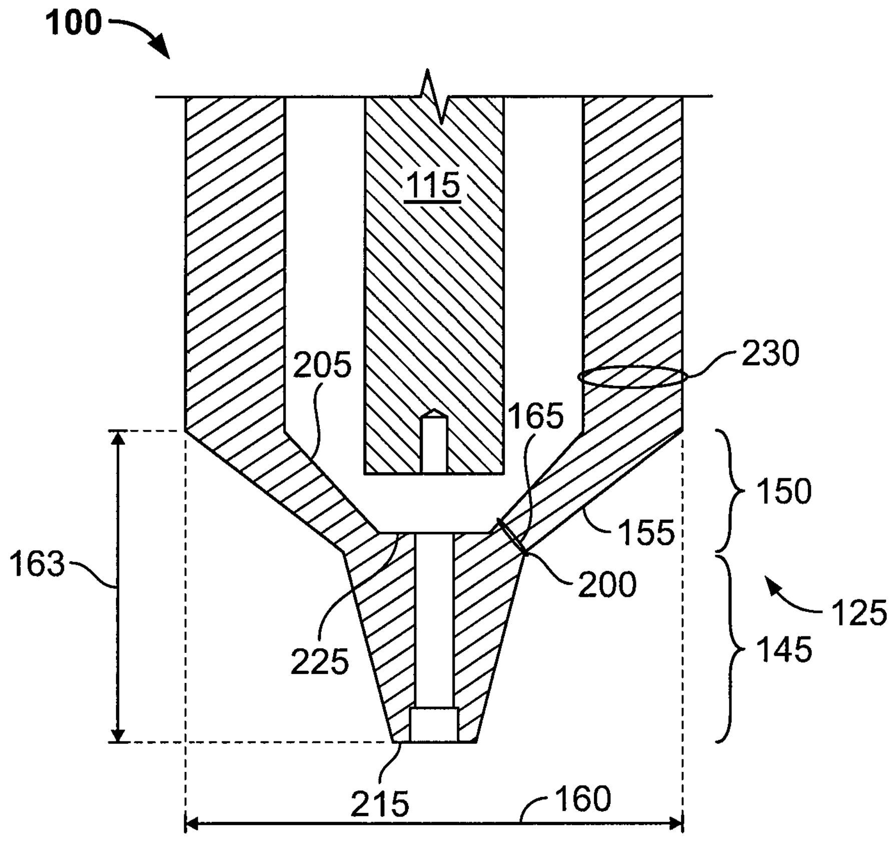

FIG. 2B illustrates a simplified view of some embodiments where the second portion 150 is disposed between the generally non-cylindrical portion 145 and an end face 215 of the nozzle head 125. In these embodiments, the generally non-cylindrical portion 145 is disposed between the end face 215 of the nozzle head 125 and the second portion 150. The body has an interior surface 205 that can be substantially cylindrical in some embodiments, such as the embodiment depicted in FIG. 2A, or tapered, such as the embodiment depicted in FIG. 2B. In some embodiments, the interior surface 205 can have rounded and/or angled corners. The nozzle head 125 can be configured with a generally non-cylindrical portion 145 having a high length 163 to width 160 ratio (i.e., pointy), to provide a torch operator (not shown) with a better line of site to the workpiece (not shown).

Figure 3A:
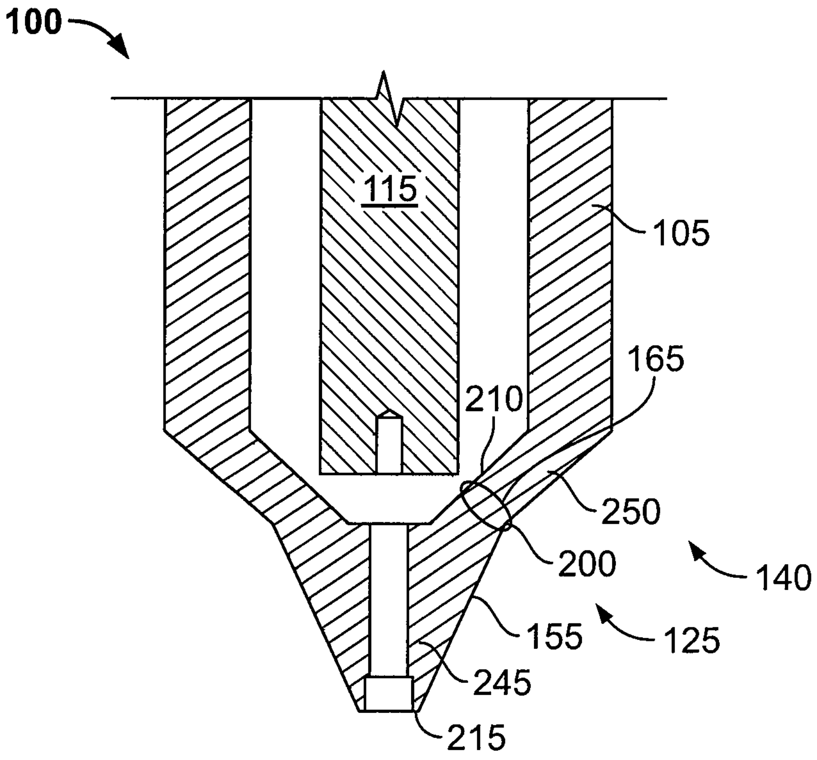
FIGS. 3A-B are simplified cross-sectional views of a gas-cooled nozzle according to an aspect of the invention.

FIG. 3A illustrates a simplified cross-sectional view of a nozzle 100 according to an aspect of the invention. The shoulder 140 includes a substantially frusto-conical portion 245 and a flared portion 250. The frusto-conical portion 245 is disposed between an end face 215 of the nozzle head 125 and the flared portion 250. The flared portion 250 is disposed between the nozzle body 105 and the frusto-conical portion 245. The substantially frusto-conical portion 245 and the flared portion 250 define an external contoured surface 155. In an embodiment, the flared portion 250 is at least substantially conical.

In some embodiments, a contour line 200 disposed on the external contoured surface 155 correlates and corresponds to a region of minimal cross-sectional thickness 165. In an embodiment, the region of minimal cross-sectional thickness 165 corresponds to a heat transfer density proportionate to about 45 amperes of operating current per 24 square millimeters of nozzle 100 cross-sectional conduction area, i.e., a heat conduction transfer rate that corresponds to less than about 2 amps of torch operating current per square millimeter of minimum nozzle heat conduction area at the region of minimum shoulder thickness. In some embodiments, the contour line 200 is disposed at the intersection of the frusto-conical portion 245 and the flared portion 250. In some embodiments, the contour line 200 is disposed between an end face 215 of the nozzle head 125 and a point 210 on the nozzle body 105 that corresponds to the insert depth of the electrode 115 at the blowback position. In some embodiments, the external contoured surface 155 includes at least one of an irregular or non-linear cross-sectional shape.

Figure 3B:
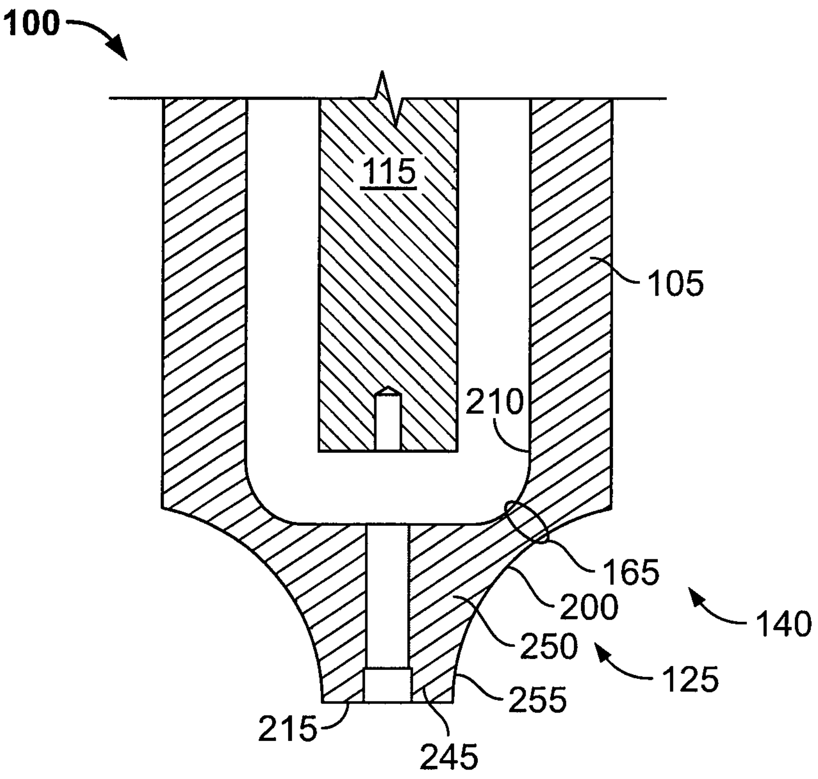

FIG. 3B illustrates a simplified view of some embodiments where the exterior surface 255 of the flared portion 250 forms a substantial portion of the external contoured surface 115. The flared portion 250 can form a curve. In some embodiments, the interior surface 205 of the body 105 has rounded corners. FIG. 3B illustrates an embodiment where the contour line 200 correlates but does not directly correspond to the region of minimal cross-sectional thickness 165. As illustrated in this figure, although the contour line 200 does correlate to the region of minimum cross-sectional thickness 165, it does not directly correspond, as the contour line 200 is nearer the end face 215 than is the region of minimum cross-sectional thickness 165.

Figure 3C:
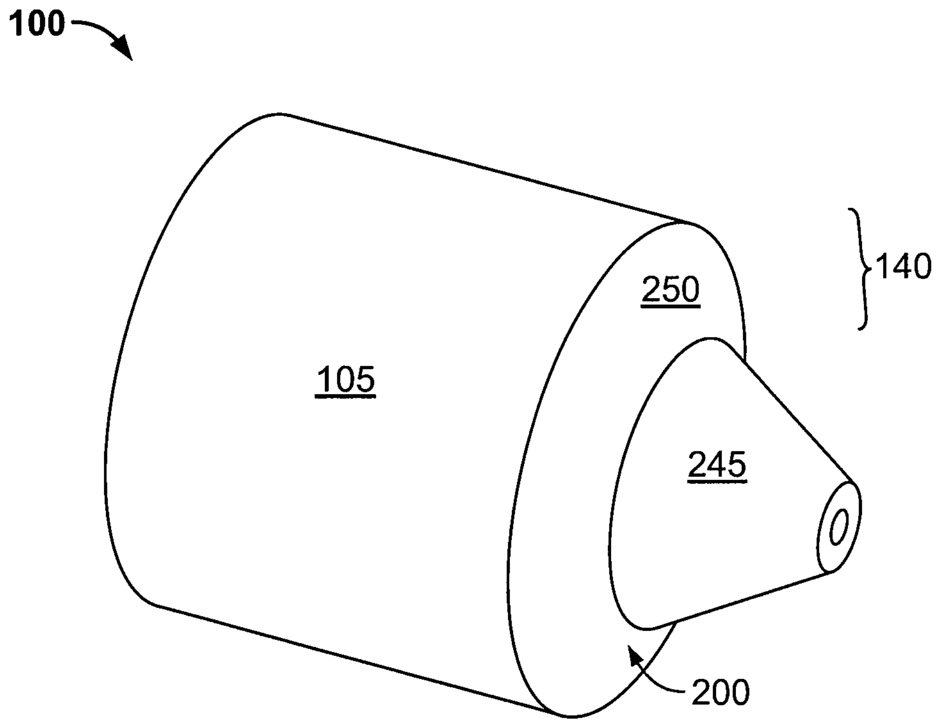
FIGS. 3C-D are simplified perspective views of a gas-cooled nozzle according to an aspect of the invention.

FIG. 3C illustrates a simplified perspective view of a gas-cooled nozzle according to an aspect of the invention. FIG. 3C depicts that the contour line 200 can be disposed at the intersection of the frusto-conical portion 245 and the flared portion 250.

Figure 3D:
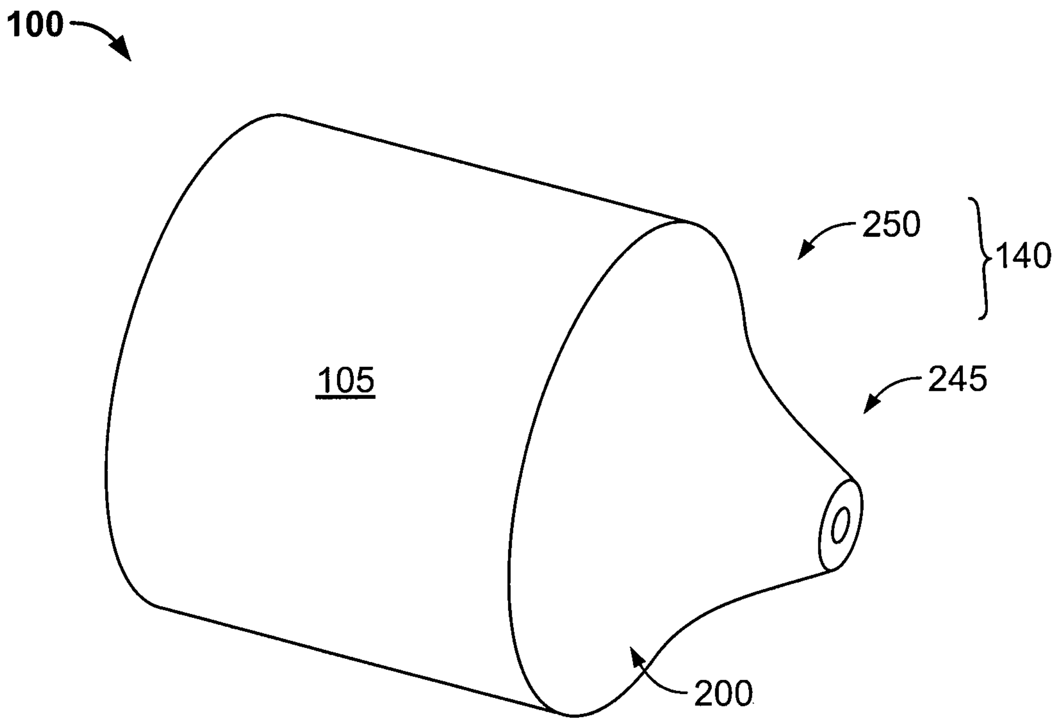

FIG. 3D illustrates a simplified perspective view of a gas-cooled nozzle according to an aspect of the invention. FIG. 3D depicts that the contour line 200 can be disposed on the flared portion 250 (i.e., the curved surface), and not at the intersection of the frusto-conical portion 245 and the flared portion 250.

Figure 4A:
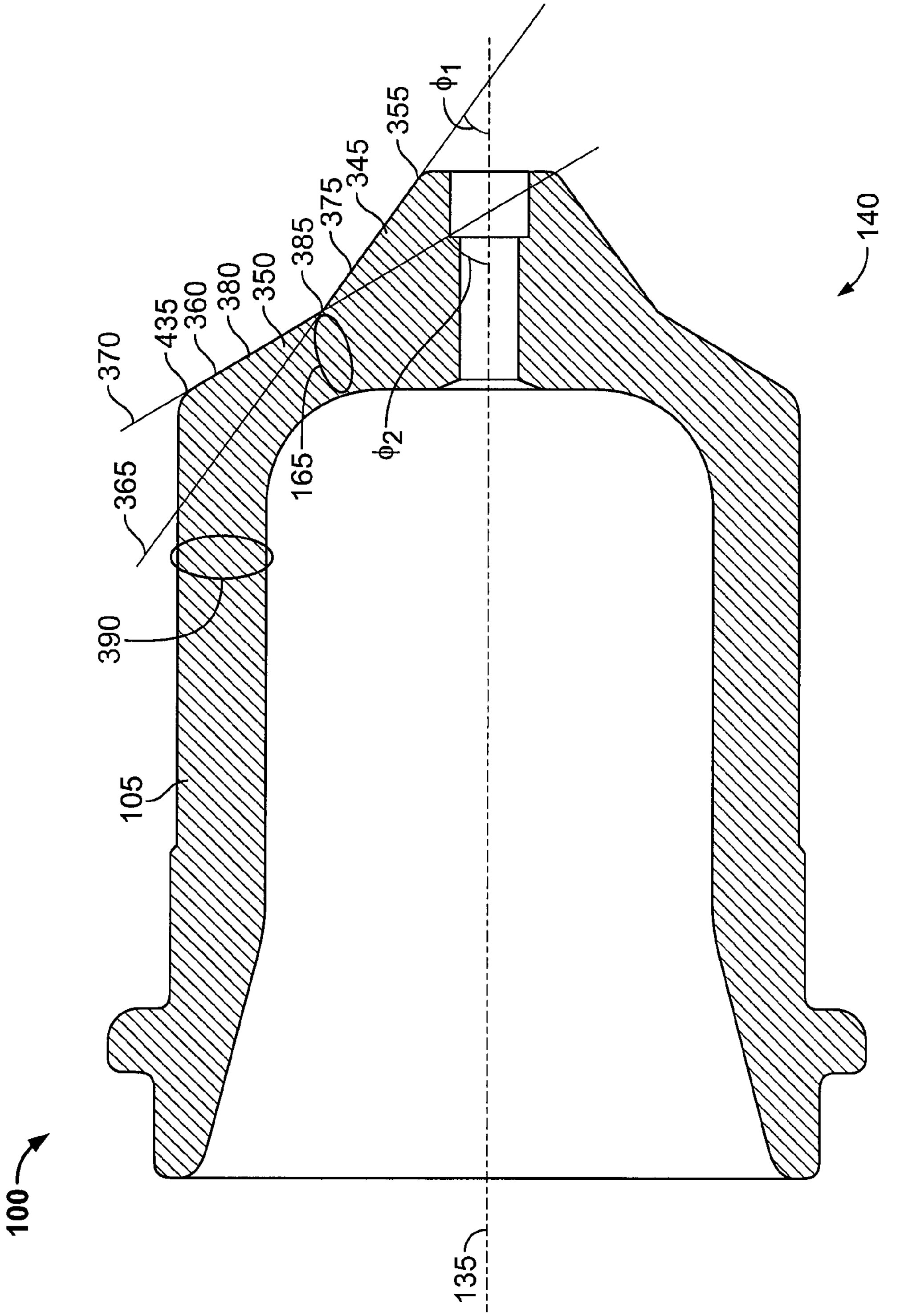
FIGS. 4A-B are simplified cross-sectional views of gas-cooled nozzles according to an aspect of the invention.

FIG. 4A is a simplified cross-sectional view of a gas-cooled nozzle 100 according to an aspect of the invention. The shoulder 140 can include a first section 345 and a second section 350 disposed within a cross-section through the central longitudinal axis 135. The first section 345 has a first external contour 355 and the second section 350 has a second external contour 360. A first angle $\phi$1 measured between the central longitudinal axis 135 and a first tangent line 365 to a point 375 on the first external contour 355 is less than a second angle $\phi$2 is measured between the central longitudinal axis 135 and a second tangent line 370 to a point 380 on the second external contour 360. The first tangent line 365 can at least substantially parallel the first external contour 355. In some embodiments, the second tangent line 370 at least substantially parallels the second external contour 360. The second tangent line 370 can pass through the second section 350 at a point 435 of the nozzle head 125 furthest from the longitudinal axis 135.

Figure 4B:
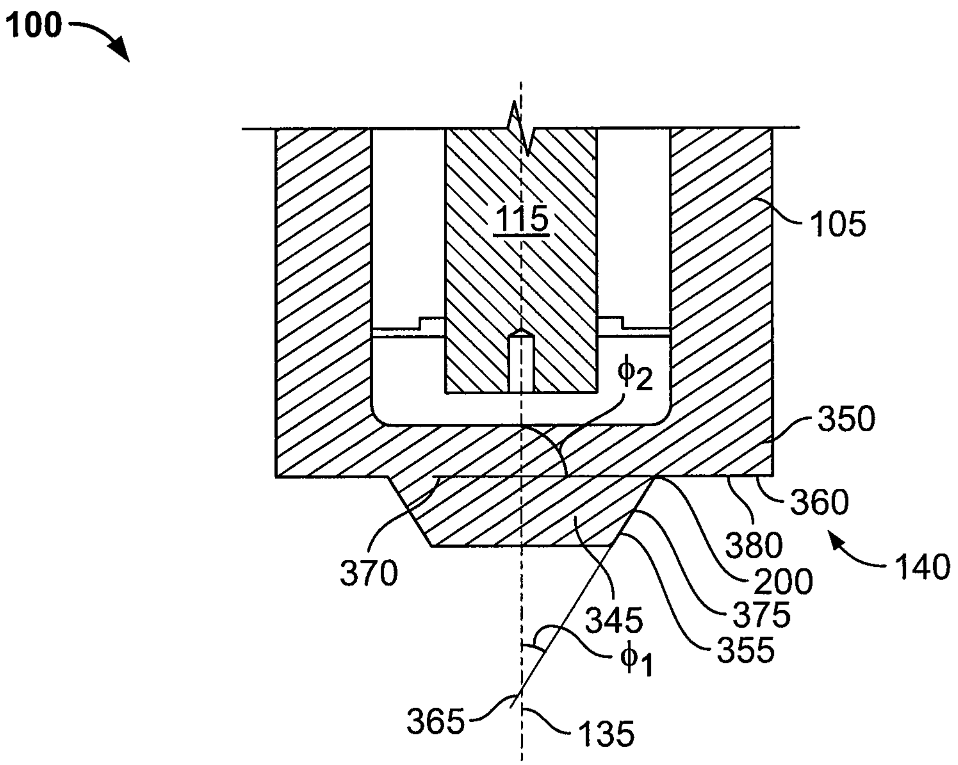
Figure 4C:
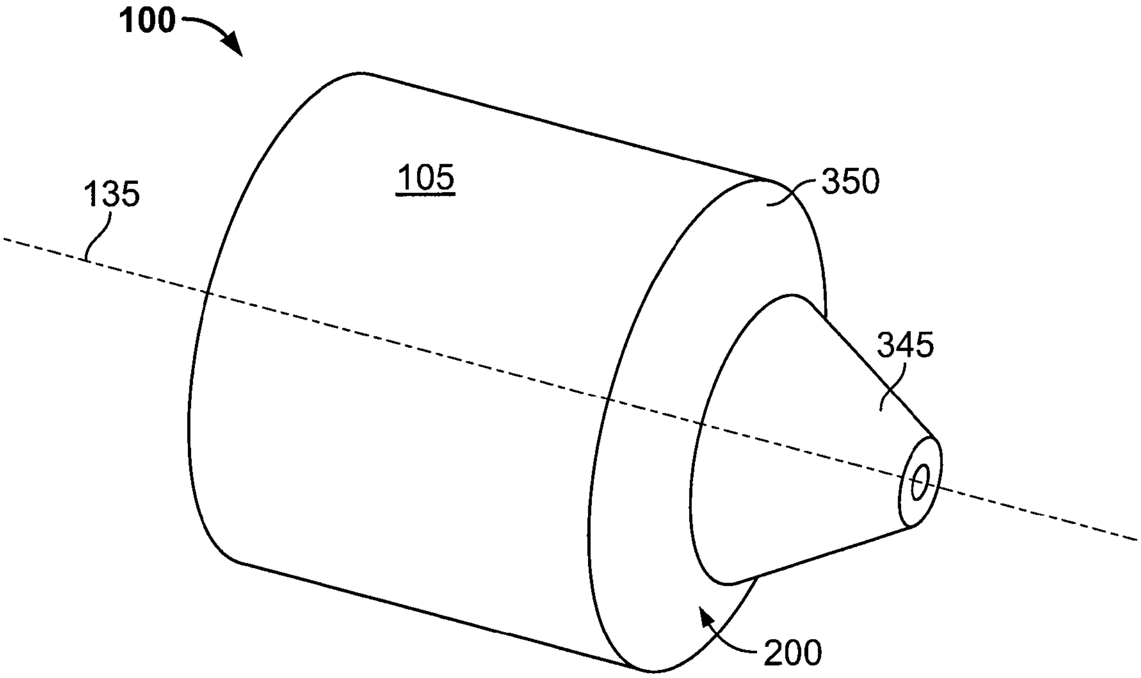
FIG. 4C is a simplified perspective view of a gas-cooled nozzle according to an aspect of the invention

U.S. Patent Publication No. 2007/0007256, the contents of which are incorporated herein by reference in their entirety, teaches that a first angle $\phi$1 can be between 20-60 degrees, and preferably, between 30-50 degrees. In some embodiments, the second angle $\phi$2 can be between 44-90 degrees. FIGS. 4B-C illustrates an embodiment of the invention where $\phi$2 is approximately ninety degrees.

Referring back to FIG. 4A, in some embodiments, a contour point 385 correlates to a region of cross-sectional minimum shoulder thickness 165. In an embodiment, the contour point 385 is identified at a location between the first external contour 355 and the second external contour 360. In some embodiments, the contour point 385 is disposed between the first external contour 355 and a second region 390 of the body 105 that identifies the intersection of the body 105 and shoulder portion 140.

In some embodiments, the external contoured surface 155 of the shoulder portion 140 defines a nonlinear or irregular surface. In some embodiments the first section 345 and the second section 350 are at least substantially conical. In some embodiments, the first section 345 and the second section 350 are at least substantially contiguous.

Figure 4D:
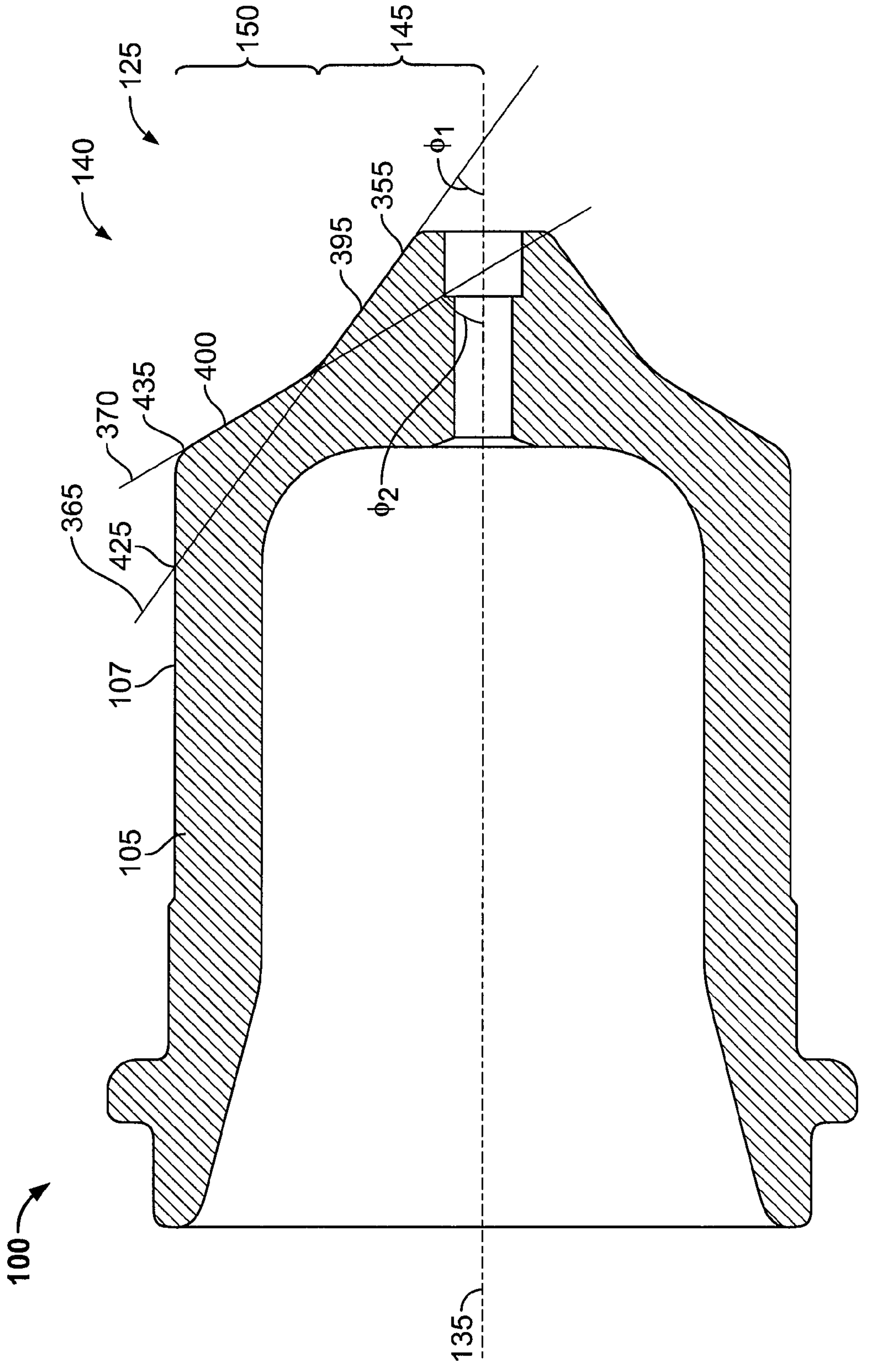
FIGS. 4D-E are simplified cross-sectional views of gas-cooled nozzles according to an aspect of the invention.

FIG. 4D illustrates an embodiment of the invention where the shoulder 140 is defined in terms of a generally non-cylindrical portion 145 and a second portion 150. Preferably, a second angle $\phi$2 measured between the longitudinal axis 135 and a second tangent line 370 to a second exterior surface 400 of the second portion 150 is greater than a first angle $\phi$1 measured between the longitudinal axis 135 and a first tangent line 365 to a first exterior surface 395 of the generally non-cylindrical portion 145. In some embodiments, the second portion 150 is disposed between the generally non-cylindrical portion 145 and a reference point 425 located by extending the first tangent line 365 to an exterior surface 107 of the body 105. In an embodiment, the second tangent line 370 passes through the second portion 150 at a point 435 furthest of the nozzle head 125 furthest from the longitudinal axis 135. The first tangent line 365 can substantially parallel the first exterior surface 395 of the generally non-cylindrical portion 145, as depicted in FIG. 4D. In addition, the second tangent line 370 can substantially parallel the second exterior surface 400 of the second portion 150, as depicted in FIG. 4D.

Figure 4E:
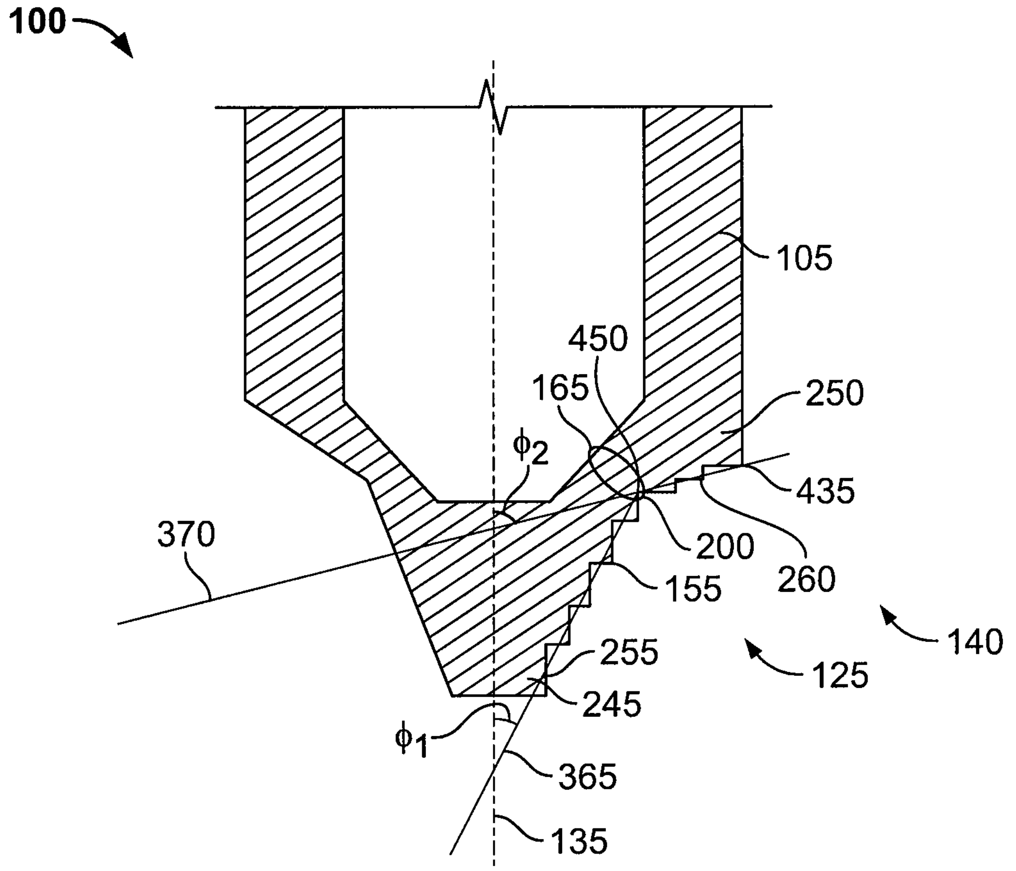

FIG. 4E illustrates an embodiment of the invention where the shoulder 140 is defined in terms of a generally frusto-conical portion 245 and a flared portion 250. The flared portion 250 can define substantially all of the external contoured surface 155. In some embodiments, a second angle $\phi$2 measured between the longitudinal axis 135 and a second tangent line 370 to an outermost exterior surface 435 of the nozzle head 125 is greater than a first angle $\phi$1 measured between the longitudinal axis 135 and a first tangent line 365 to a point 450 on the shoulder 140 that corresponds to the contour line 200. Referring to FIG. 4E, the first tangent line 365 can substantially parallel the exterior surface 255 of the generally frusto-conical portion 245, and the second tangent line 370 can substantially parallel the exterior surface 260 of the flared portion 250.

Figure 5A:
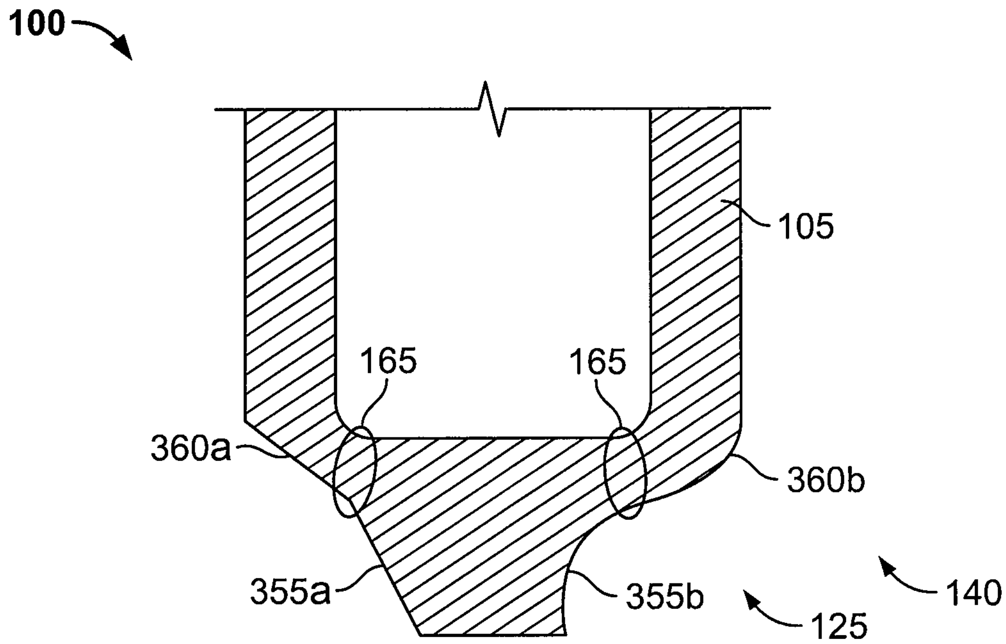
FIGS. 5A-I are exemplary embodiments of simplified cross sections of a nozzle.

FIGS. 5A-5I are exemplary embodiments of simplified cross sections of nozzle 100. The exemplary embodiments can be combined in many combinations, and are not limited to the examples illustrated in these figures. For example, FIG. 5A illustrates that the first external contour 355 can be linear 355a or non-linear 355*b*, and that the second external contour 360 can be linear 360*a* or non-linear 360*b*. In some embodiments, the first external contour 355 and the second external contour 360 can be contiguous, such as, for example, the first external contour 355*b* and second external contour 360*b*. In addition, FIG. 5A illustrates that the first external contour 355 and the second external contour 360 can be asymmetric.

Figure 5B:
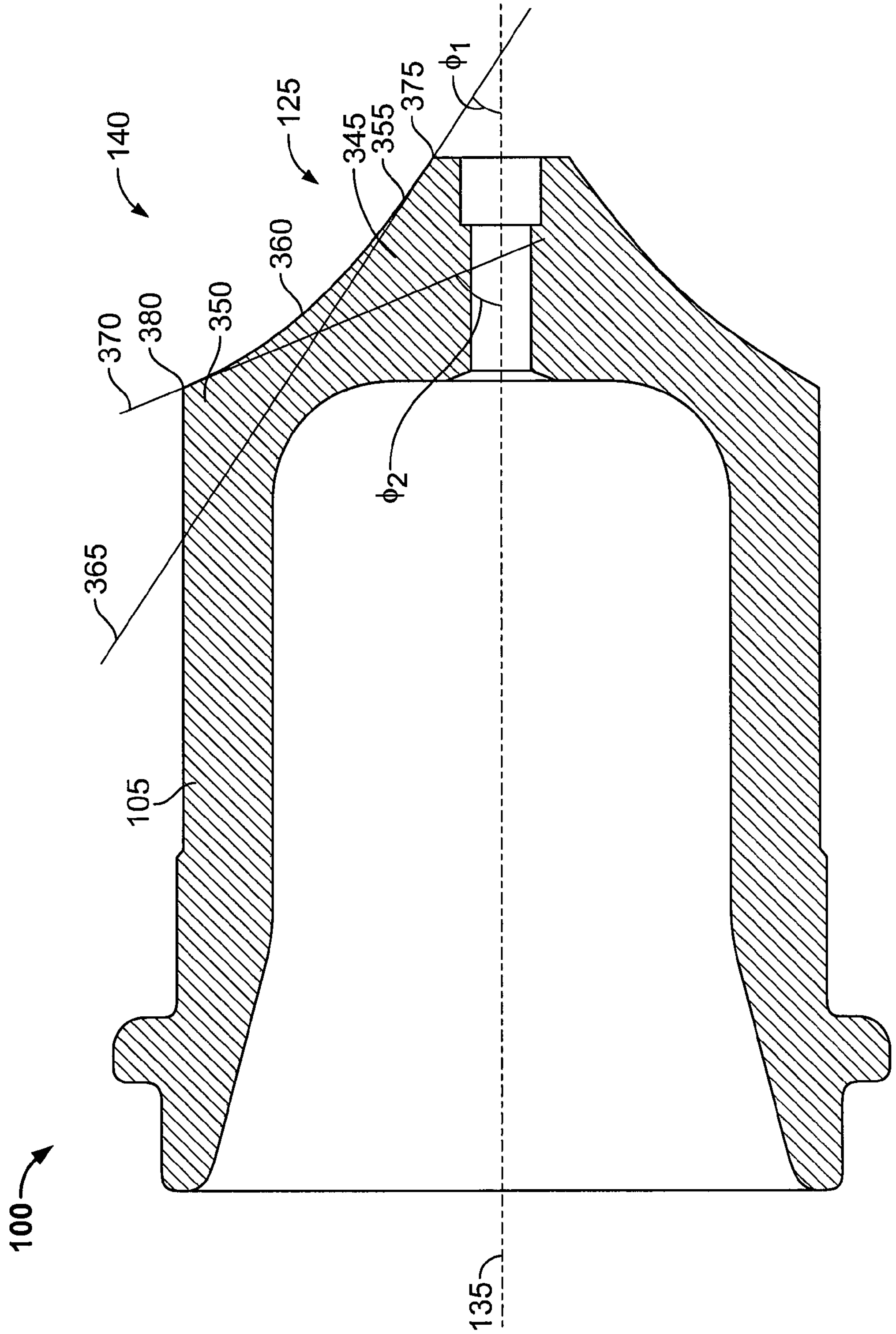

FIG. 5B illustrates that the first external contour 355 and the second external contour 360 can, together, define a curve. Referring to FIG. 5B, a first tangent line 365 can be drawn to a first point 375 on a first shoulder section 345, such that the first tangent line 365 substantially parallels the first shoulder section 345. A second tangent line 370 can be drawn to a second point 380 on a second shoulder section 350, such that the second tangent line 370 substantially parallels the second shoulder section 350. A first angle ϕ1 can be measured between the first tangent line 365 and the central longitudinal axis 135, and a second angle ϕ2 can be measured between the second tangent line 370 and the central longitudinal axis 135. In some embodiments, the first angle ϕ1 is less than the second angle ϕ2.

Figure 5C:
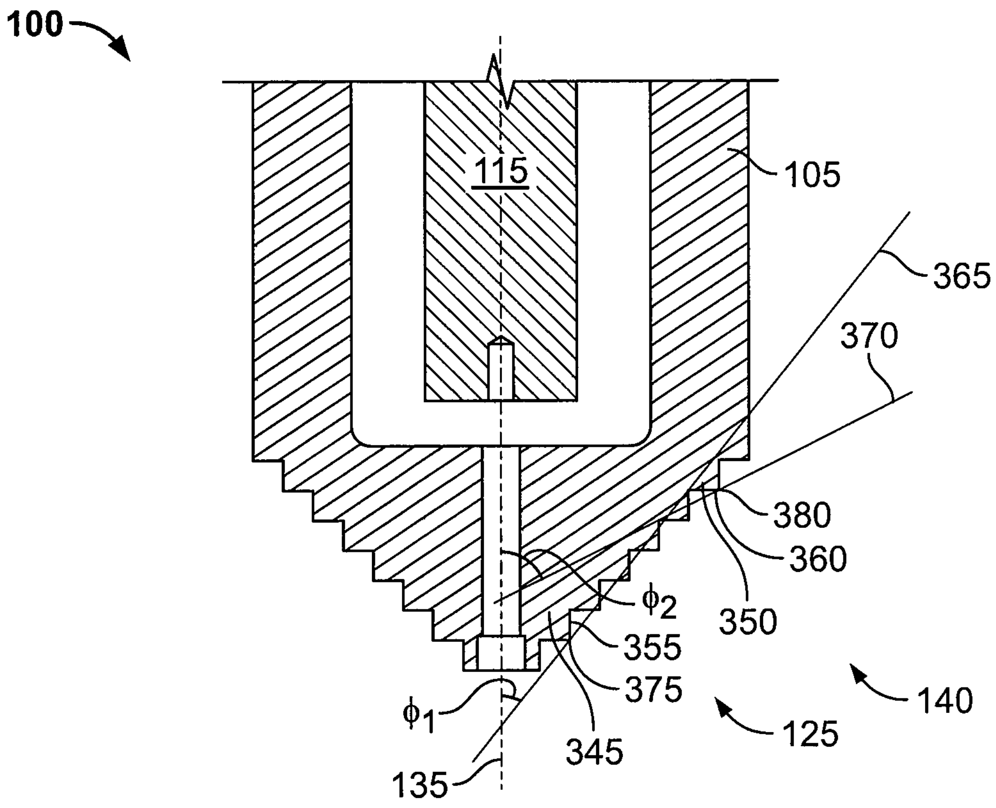

FIG. 5C illustrates that the first external contour 355 and the second external contour 360 can be non-linear with a regular pattern. Referring to FIG. 5C, a first tangent line 365 can be drawn to a first point 375 on a first shoulder section 345, such that the first tangent line 365 substantially parallels the first shoulder section 345. A second tangent line 370 can be drawn to a second point 380 on a second shoulder section 350, such that the second tangent line 370 substantially parallels the second shoulder section 350. A first angle ϕ1 can be measured between the first tangent line 365 and the central longitudinal axis 135, and a second angle ϕ2 can be measured between the second tangent line 370 and the central longitudinal axis 135. In some embodiments, the first angle ϕ1 is less than the second angle ϕ2.

Figure 5D:
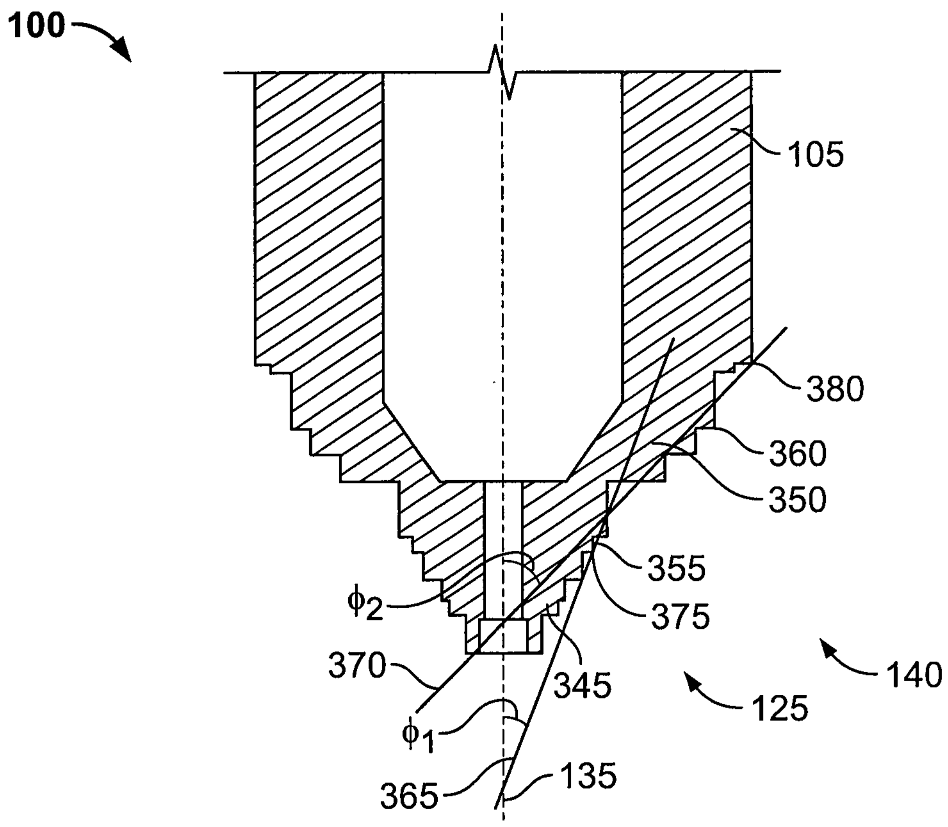

FIG. 5D illustrates that the first external contour 355 and the second external contour 360 can be non-linear with an irregular pattern. Referring to FIG. 5D, a first tangent line 365 can be drawn to a first point 375 on a first shoulder section 345, such that the first tangent line 365 substantially parallels the first shoulder section 345. A second tangent line 370 can be drawn to a second point 380 on a second shoulder section 350, such that the second tangent line 370 substantially parallels the second shoulder section 350. A first angle ϕ1 can be measured between the first tangent line 365 and the central longitudinal axis 135, and a second angle ϕ2 can be measured between the second tangent line 370 and the central longitudinal axis 135. In some embodiments, the first angle ϕ1 is less than the second angle ϕ2.

Figure 5E:
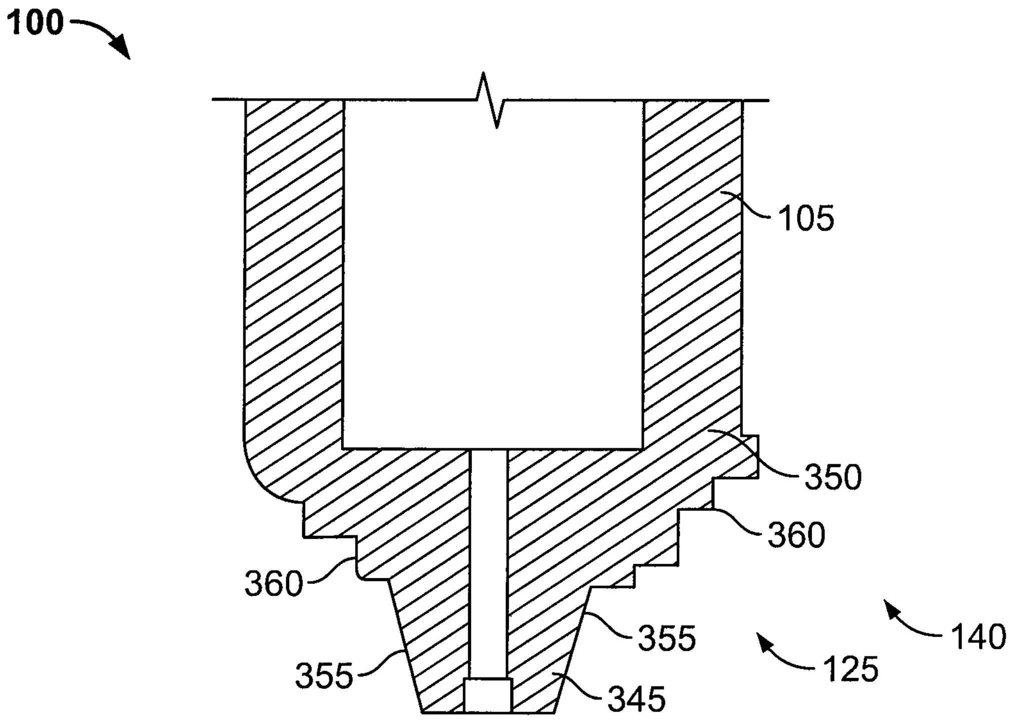
Figure 5F:
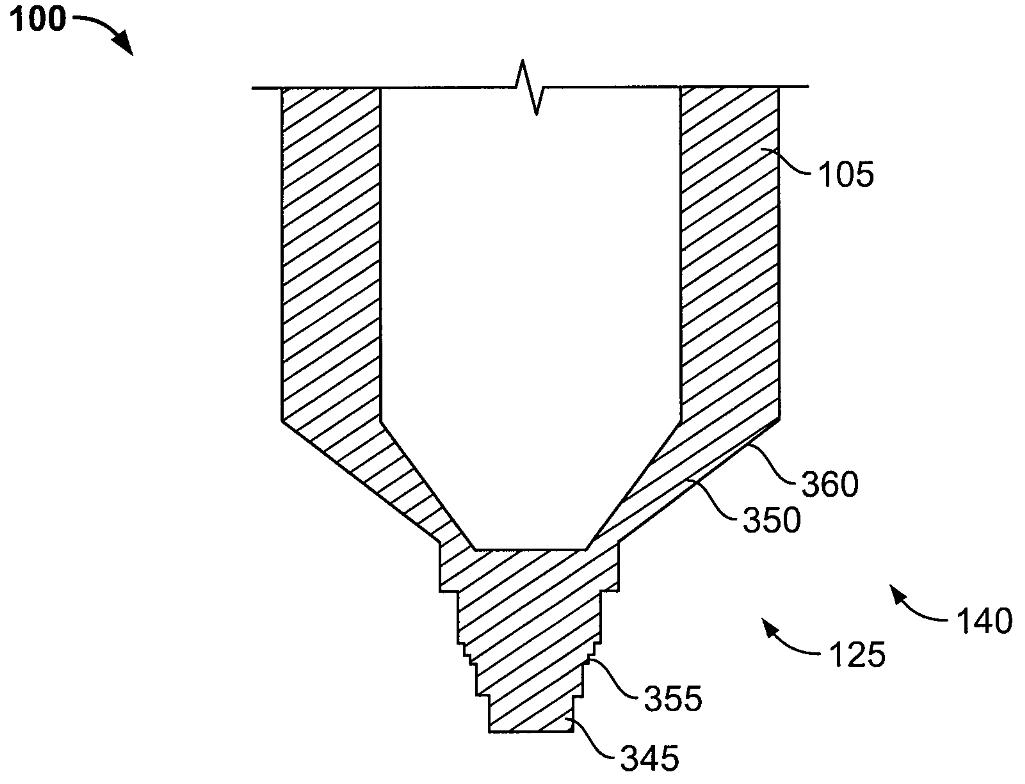
Figure 5G:
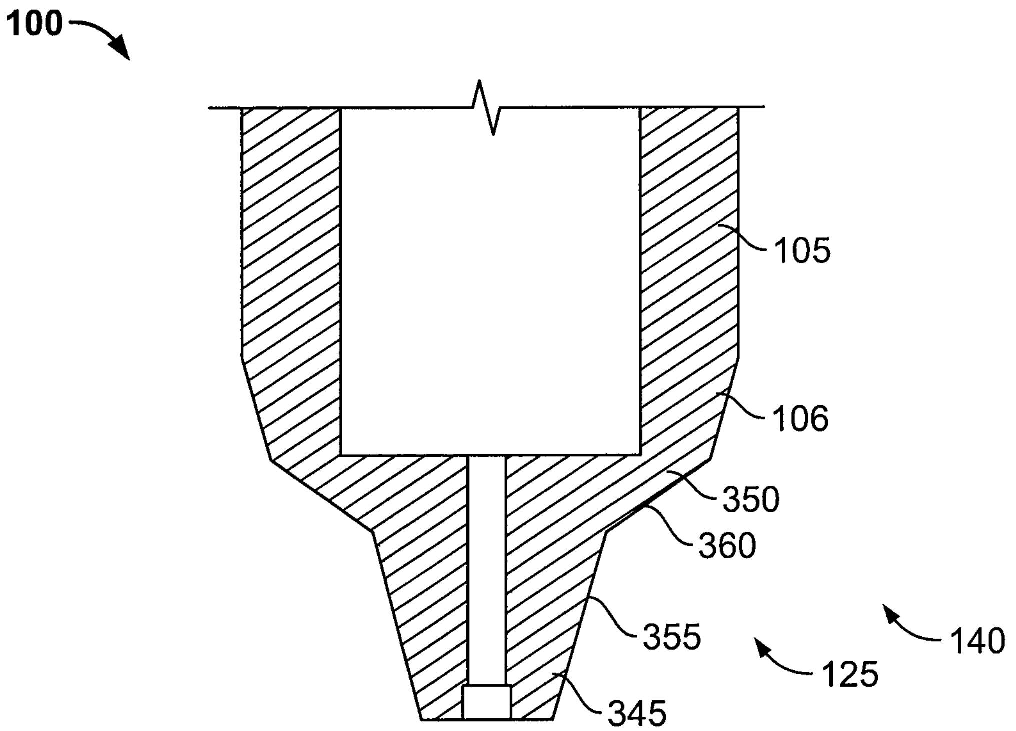
Figure 5H:
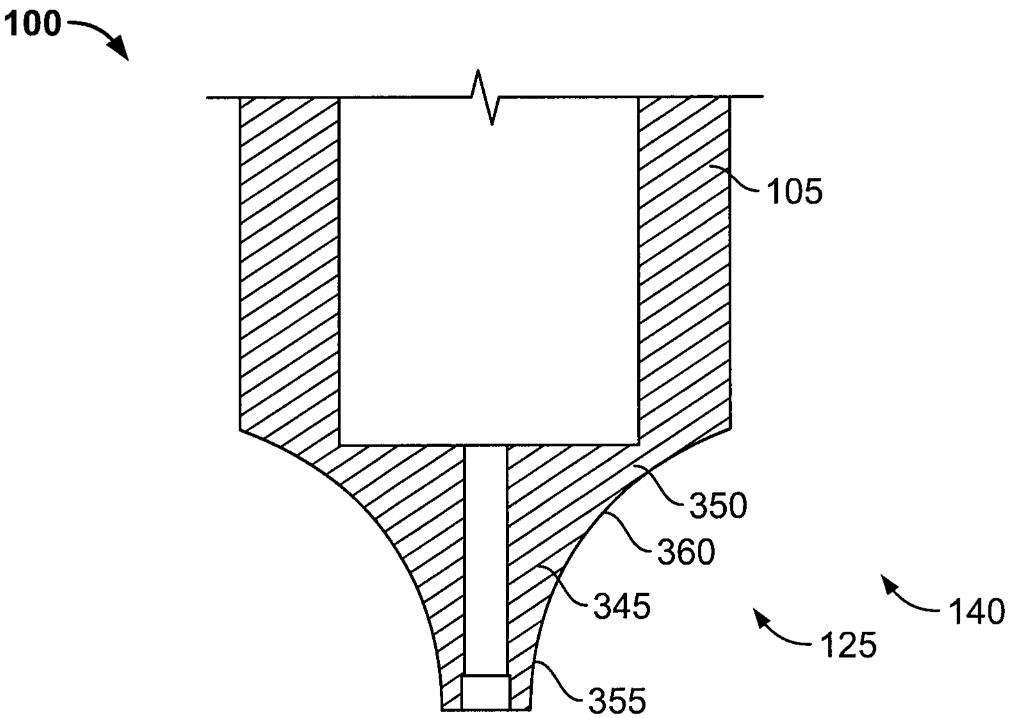
Figure 5I:
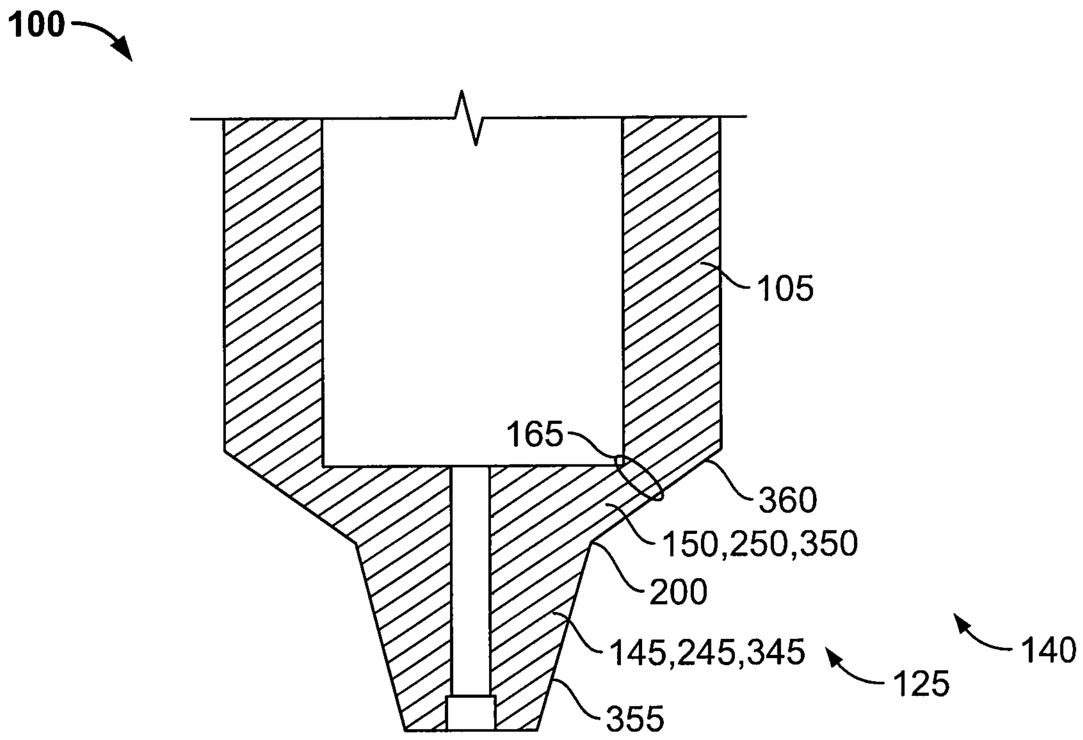

FIG. 5E illustrates that the first external contour 355 can be linear and the second external contour 360 can be irregular. FIG. 5F illustrates an embodiment in which the first external contour 355 can be irregular and the second external contour 360 can be linear. FIG. 5G illustrates that the body 105 can have a tapered portion 106. FIG. 5H illustrates that the first external contour 355 and the second external contour 360 can comprise multiple angles. FIG. 5I illustrates that the contour line 200 that identifies the region of minimum cross-sectional thickness 165 can be disposed within the flared portion 250, the second portion 150, or the second shoulder section 350, closer to the nozzle body 105 than the generally non-cylindrical portion 145, frusto-conical portion 245, or the first shoulder section 345.

Figure 6:
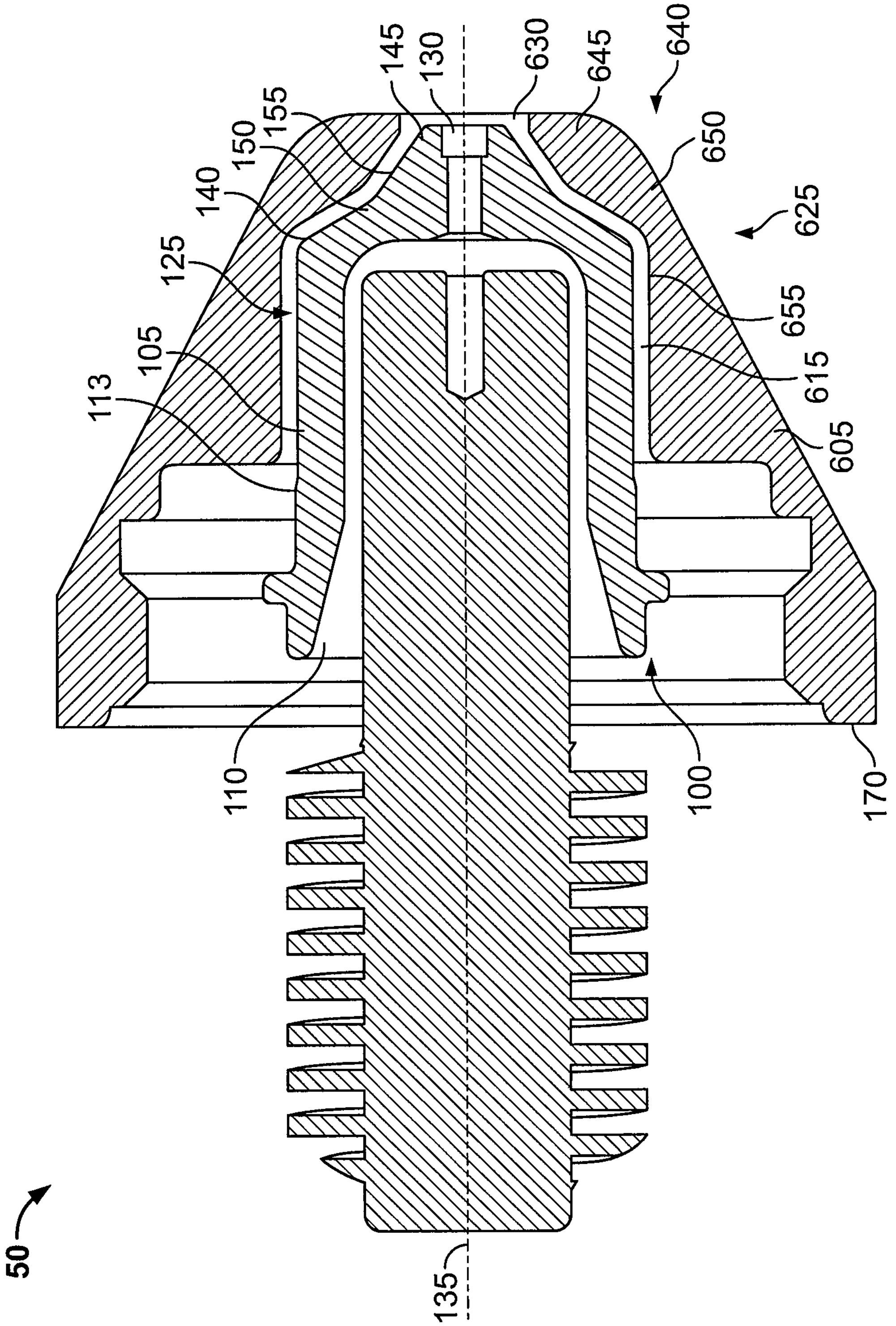
FIG. 6 is a cross-sectional view of a gas-cooled torch tip according to an aspect of the invention.

FIG. 6 is a cross-sectional view of a gas-cooled torch tip according to an aspect of the invention. The torch tip 50 includes a nozzle 100 and a shield 170. The nozzle 100 includes a nozzle body 105 comprising a hollow interior 110. The nozzle body 105 includes a substantially cylindrical portion 113 that defines a central longitudinal axis 135. The nozzle 100 also includes a nozzle head 125 defining a nozzle shoulder portion 140 and an exit orifice 130. The nozzle shoulder portion 140 comprises a first generally non-cylindrical portion 145 and a second nozzle portion 150 that, in combination, define an external contoured surface 155. The second nozzle portion 150 is disposed between the first generally non-cylindrical portion 145 and the nozzle body 105.

A shield 170 includes a shield body 605 and a shield head 625. The shield body 605 includes a fastener (not shown) for securing the shield 170 to the torch body 105 in a spaced relationship relative to the nozzle 100, for routing a shield gas through a space 615 between the shield body 605 and the nozzle 100. The shield head 625 defines a shield exit orifice 630 and a shield shoulder portion 640. The shield shoulder portion comprises a second generally non-cylindrical portion 645 and a second shield portion 650 that, in combination, define an internal contoured surface 655. The second shield portion 650 can be disposed between the second generally non-cylindrical portion 645 and the shield body 605, such that the second shield portion 650 and the second generally non-cylindrical portion 645 correspond to the first shield portion 150 and the first generally non-cylindrical portion 145 respectively.

Figure 6A:
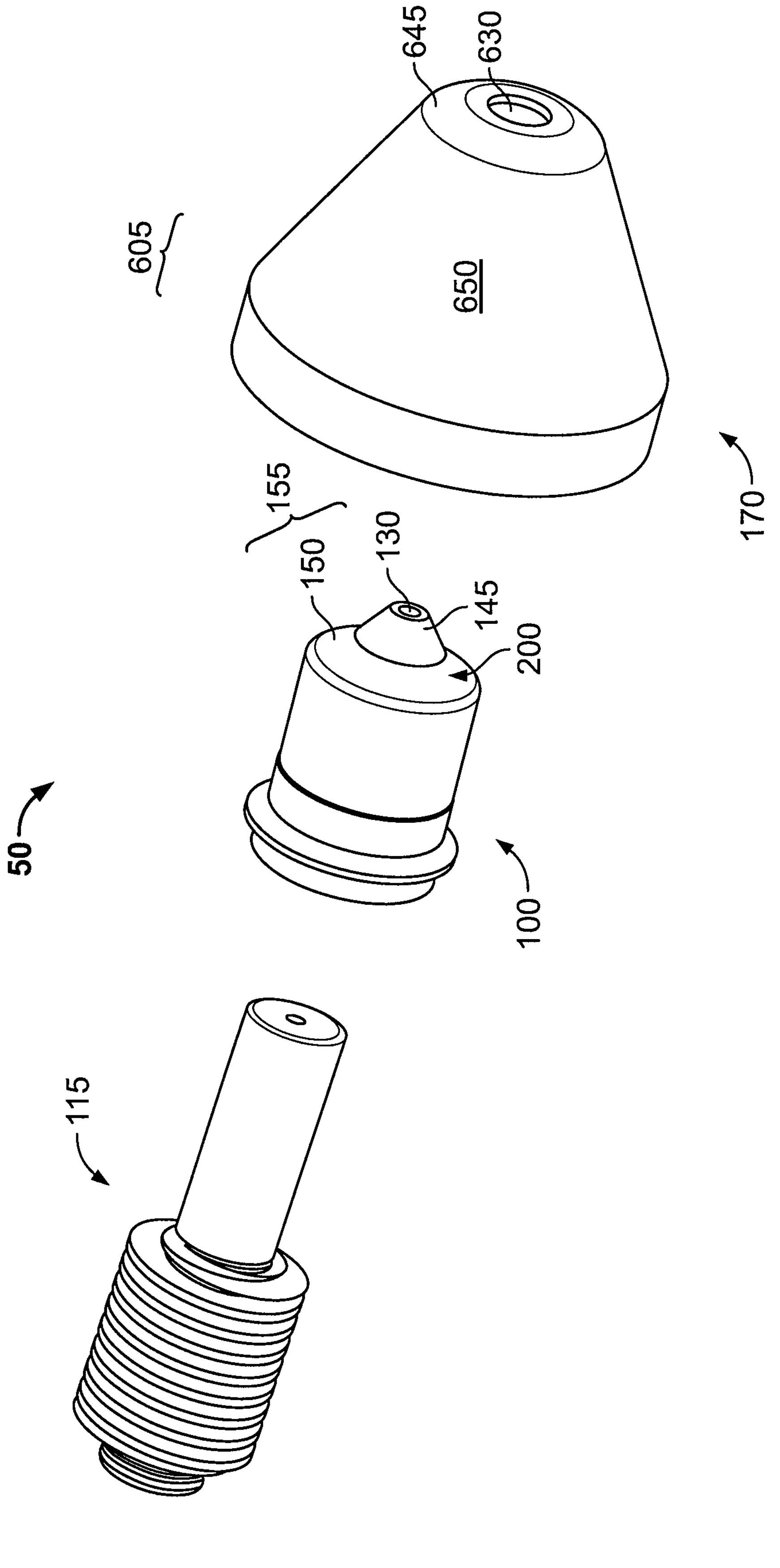
FIG. 6A is a perspective view of a gas-cooled torch tip according to an aspect of the invention.

FIG. 6A is a perspective view of a gas-cooled torch tip according to an aspect of the invention. The torch tip 50 includes a nozzle 100 and a shield 170. An electrode 115 is also shown in FIG. 6A for clarity. The nozzle 100 comprises a first generally non-cylindrical portion 145 and a second nozzle portion 150 defining an external contoured surface 155. The external contoured surface 155 can define a contour line 200.

Still referring to FIG. 6A, the shield 170 can include a second generally non-cylindrical portion 645 and a second shield portion 650. The second shield portion 650 and the second generally non-cylindrical portion 645 can correspond to the first shield portion 150 and the first generally non-cylindrical portion 145 respectively.

Figure 7:
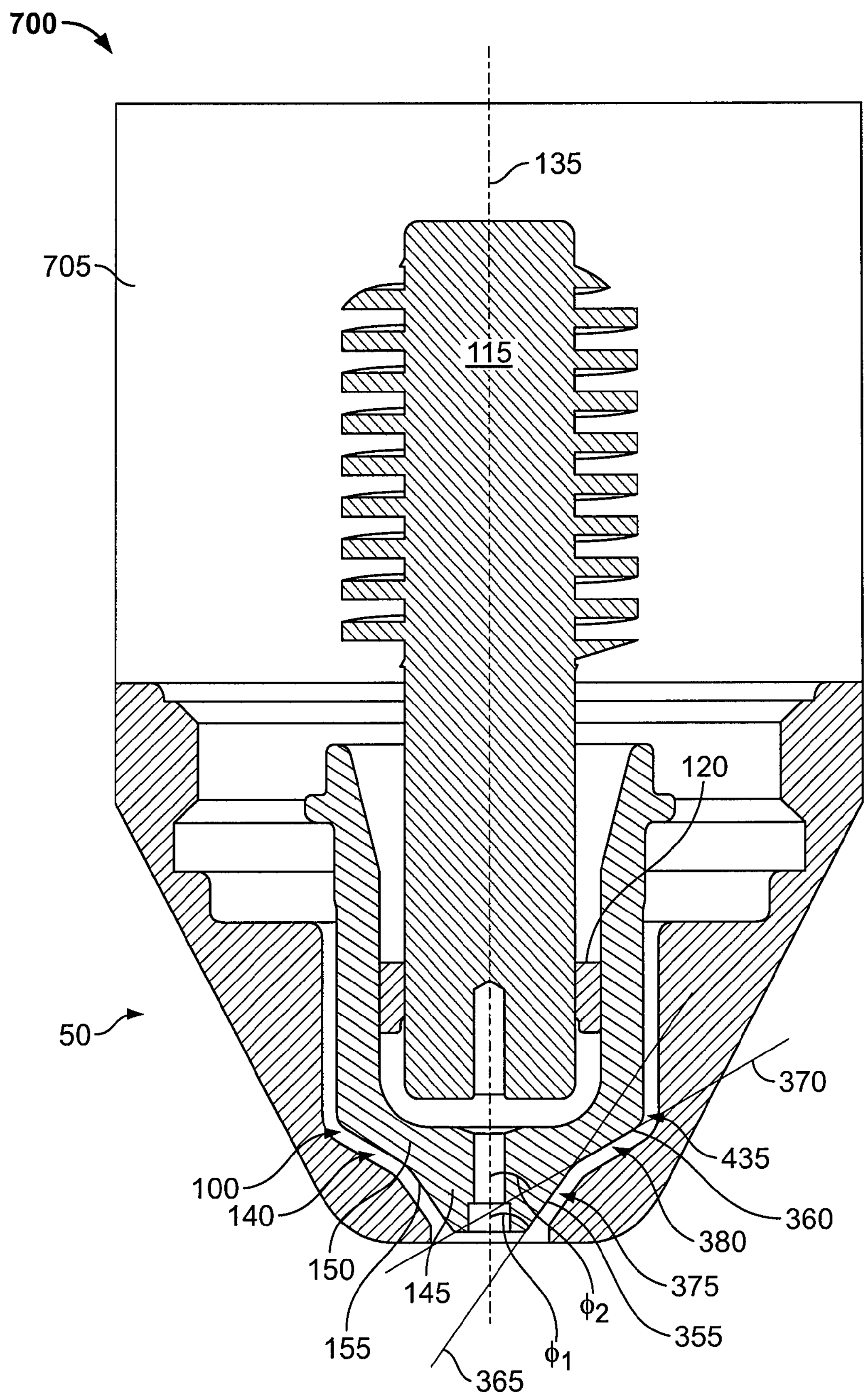
FIG. 7 is a cross-sectional view of a gas-cooled torch according to an aspect of the invention.

FIG. 7 is a cross-sectional view of a gas-cooled torch according to an aspect of the invention. The torch 700 can include an electrode 115 disposed and a swirl ring 120 disposed within a torch body 705, and the torch tip 50. In a preferred embodiment, the nozzle 100 includes a shoulder 140 having a generally non-cylindrical portion 145 and a second portion 150. The generally non-cylindrical portion 145 and the second portion 150 can, in combination, define an external contoured surface 155. A first angle ϕ1 measured between the central longitudinal axis 135 and a first tangent line 365 to a point 375 on the external contoured surface 155 of the generally non-cylindrical portion 145 is less than a second angle ϕ2 is measured between the central longitudinal axis 135 and a second tangent line 370 to a point 380 on the external contoured surface 155 of the second portion 150. The first tangent line 365 can at least substantially parallel the first external contour 355. In some embodiments, the second tangent line 370 at least substantially parallels the second external contour 360. The second tangent line 370 can pass through the second portion 150 at a point 435 of the nozzle head 125 furthest from the longitudinal axis 135. In some embodiments, the first angle ϕ1 can be between 30-50 degrees and the second angle ϕ2 can be approximately 90 degrees. The generally non-cylindrical portion 145 and the second portion 150 can be at least substantially conical. In some embodiments, the generally non-cylindrical portion 145 and the second portion 150 are at least substantially contiguous.

Figure 8:
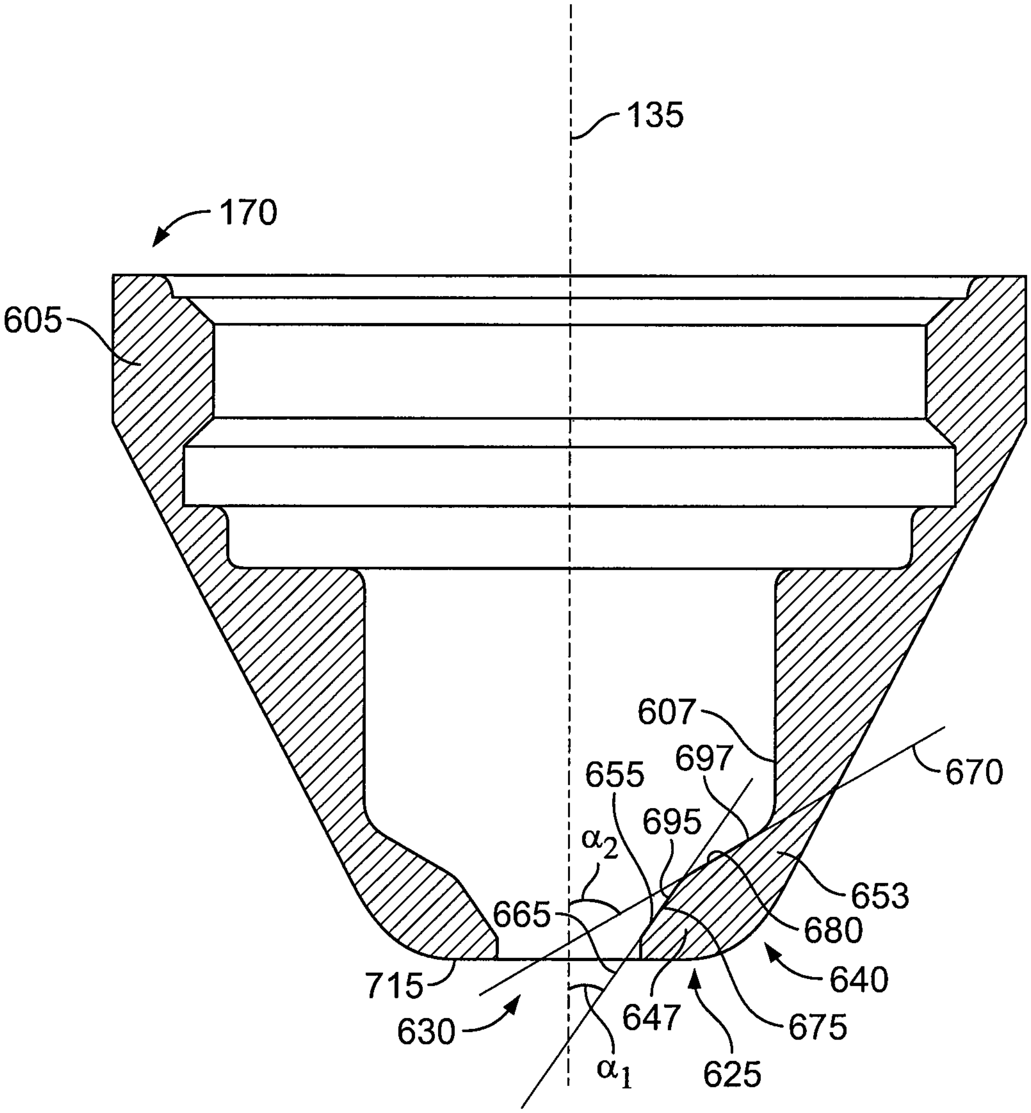
FIG. 8 is a cross-sectional view of a simplified shield according to an aspect of the invention.

FIG. 8 is a cross-sectional view of a simplified shield according to an aspect of the invention. The shield 170 includes a shield body 605 and a shield head 625. The shield body 605 includes a fastener (not shown) for securing the shield 170 to a torch body (e.g., the torch body 105 of FIG. 3A) in a spaced relationship relative to a nozzle (e.g., the nozzle 100 of FIG. 3A), for routing a shield gas through a space 615 between the shield body 605 and the nozzle. The shield head 625 defines an exit orifice 630 disposed about a central longitudinal axis 135 and a shoulder portion 640 defining an internal contoured surface 655. The shoulder portion 640 has a first section 647 and a second section 653 disposed within a cross section of the shoulder portion 640 that passes through the central longitudinal axis 135. The first section 647 has a first internal contour 695 disposed between an end face 715 of the shield head 625 and an internal surface 607 of the shield body 605. The second section 653 has a second internal contour 697 between the internal surface 607 and the first internal contour 695.

The first section 647 and the second section 653 are configured such that a first angle $\alpha 1$ measured between the central longitudinal axis 135 and a first tangent line 665 to a first point 675 on the first internal contour 695 is less than an angle $\alpha 2$ between the central longitudinal axis 135 and a second tangent line 670 to a second point 680 on the second internal contour 697. In some embodiments, $\alpha 2$ approximately equals 90 degrees. In some embodiments, the first section 647 and the second section 653 are at least substantially conical.

Figure 9A:
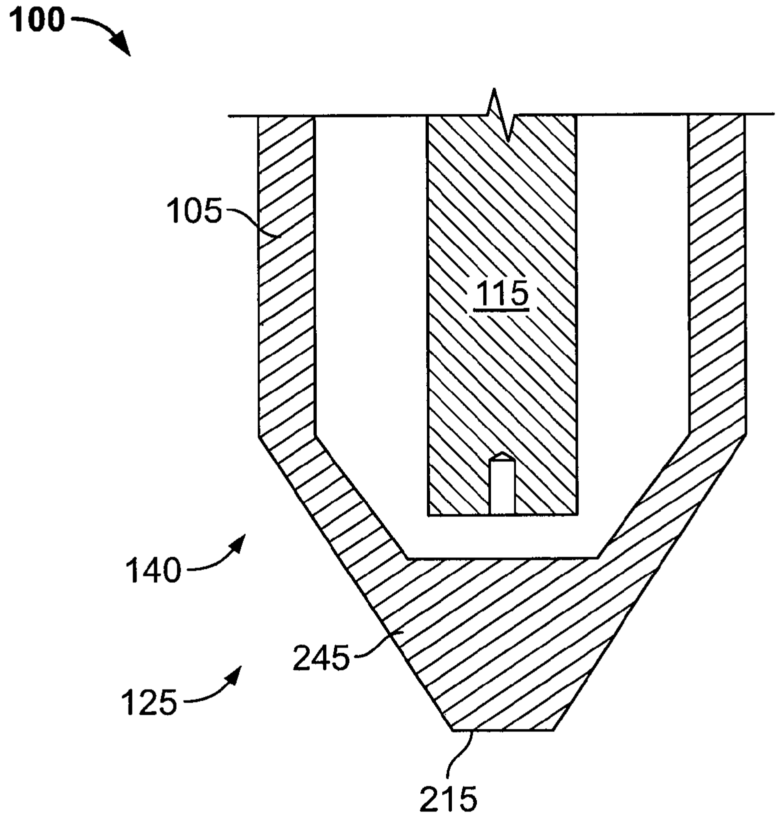
FIGS. 9A-B are illustrations of a method of increasing the life of a nozzle according to an aspect of the invention.
Figure 9B:
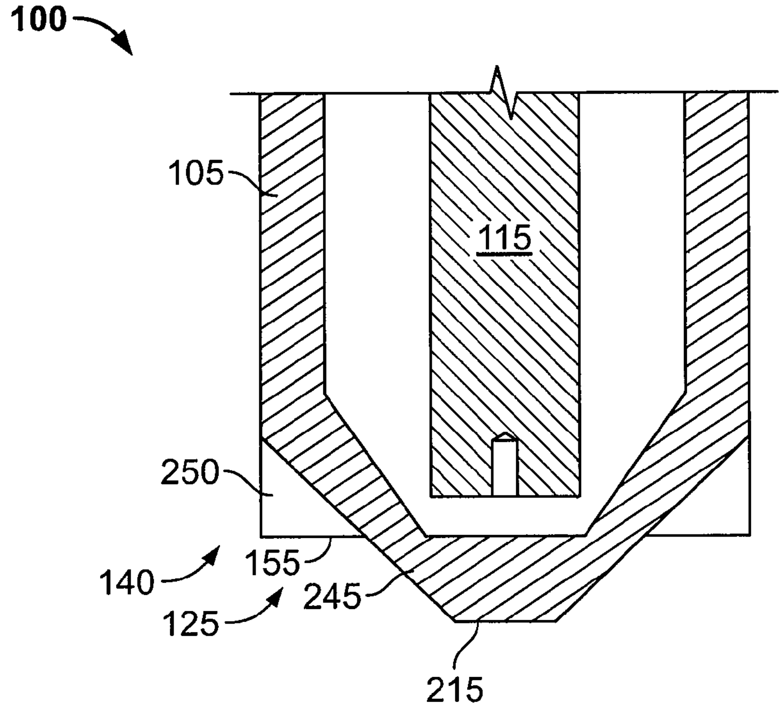

FIGS. 9A-B are illustrations of a method of increasing the life of a nozzle. In an aspect of the invention, as illustrated in FIG. 9A, the method includes providing a nozzle 100 having a body 105 and a nozzle head 125. The nozzle head 125 defines a shoulder 140 having an at least substantially frusto-conical shoulder portion 245 such that a first wear rate results. As illustrated in FIG. 9B, the method further comprises defining a flared portion 250 that, in combination with the at least substantially frusto-conical portion 245, defines a shoulder 140 having an external contoured surface 155. At least a portion of the frusto-conical portion 245 is disposed between an end face 215 of the nozzle head 125 and the flared portion 250 and flared portion 250 is disposed between the frusto-conical portion 245 and the body 105, such that a second nozzle wear rate results, the first nozzle wear rate less than the second nozzle wear rate.

The method includes a step of providing a nozzle (e.g., 100) having a body (e.g., 105) and a nozzle head (e.g., 125), the nozzle head defining an at least substantially frusto-conical shoulder portion (e.g., 245) such that a first nozzle wear rate results. The method also includes a step of defining a flared shoulder portion (e.g., 250) that, in combination with the at least substantially frusto-conical shoulder portion, defines a nozzle shoulder (e.g., 140) having an external contoured surface (e.g., 155), at least a portion of the frusto-conical surface disposed between an end face (e.g., 215) of a nozzle head (e.g., 125) and the flared portion, the flared portion disposed between the body and the frusto-conical portion, such that a second nozzle wear rate results, the second nozzle wear rate less than the first nozzle wear rate.

The method can include at least some optional steps. In some embodiments, the method includes a step of forming the flared shoulder portion such that a second angle (e.g., $\phi 2$) measured between the central longitudinal axis (e.g., 135) and a second tangent line (e.g., 370) to an outermost exterior surface (e.g., 445) of the nozzle head is greater than a first angle (e.g., $\phi 1$) measured between the central longitudinal axis and a first tangent line (e.g., 365) to a point on the shoulder that corresponds to the contour line (e.g., 200). In addition, the method can include a step of defining the second angle to be approximately 90 degrees.

In some embodiments, the method can include a step of establishing a contour line on the external contoured surface that identifies a region of a minimum shoulder thickness (e.g., 165) between the generally non-cylindrical portion and the second portion. The method can include a step of positioning the contour line to be at the intersection of the frusto-conical portion and the flared portion. In some embodiments, the method can further include a step of disposing the contour line nearer the longitudinal axis than an inside diameter of the body (e.g., 117).

The method can include a step of defining the external contoured surface with an irregular or non-linear cross-sectional shape. In some embodiments the method includes a step of defining the flared portion as substantially conical. The method can include a step of establishing the region of minimum shoulder thickness with at least a minimum thickness to correspond to a heat transfer density proportionate to about 45 amperes of torch operating current per 24 square millimeters of nozzle cross-sectional conduction area, i.e., a heat conduction transfer rate that corresponds to less than about 2 amps of torch operating current per square millimeter of minimum nozzle heat conduction area at the region of minimum shoulder thickness.

Figure 10:
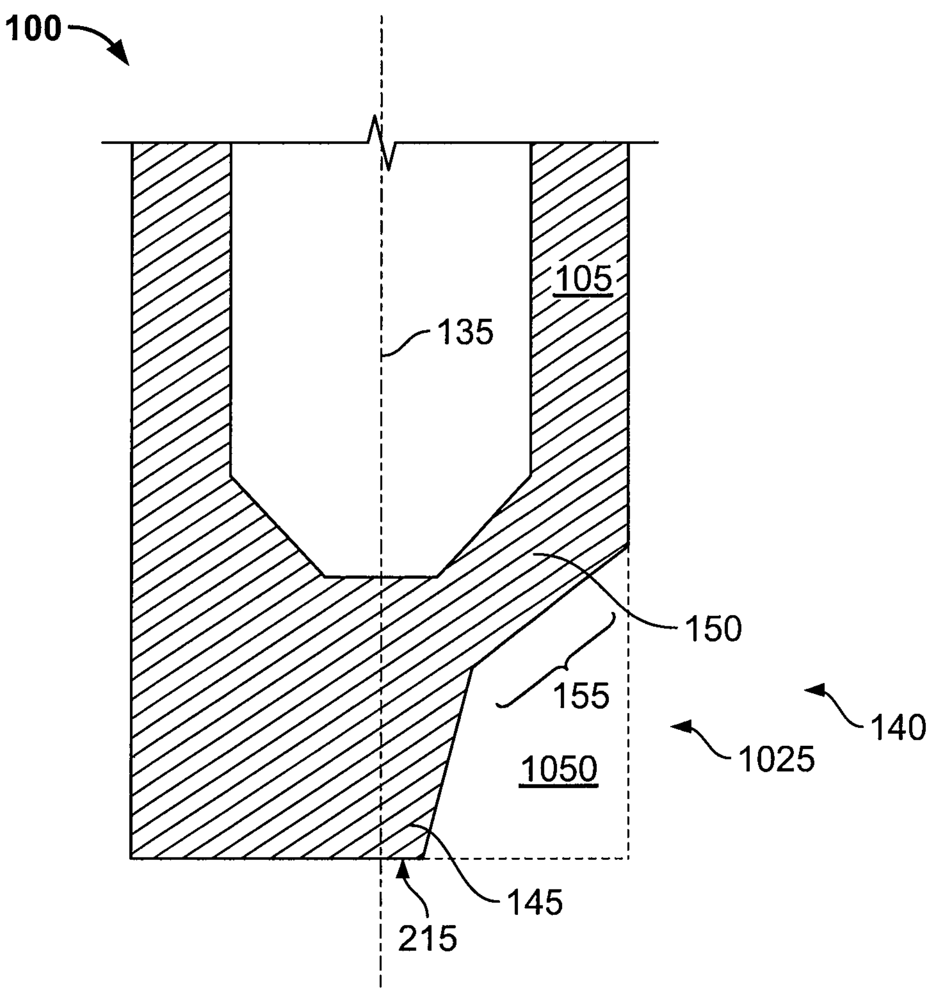
FIG. 10 illustrates a method of manufacturing a nozzle according to an aspect of the invention.

FIG. 10 illustrates a method of manufacturing a nozzle according to an aspect of the invention. In a first embodiment, as illustrated in FIG. 10A, the method includes providing an at least substantially cylindrical nozzle 100 having an at least substantially cylindrical nozzle head 1025 disposed about a central longitudinal axis 135. The method further includes removing a section 1050 of the nozzle head 1025 to define a shoulder portion 140 between an end face 215 of the nozzle head 1025 and the body 105, the shoulder portion 140 produced thereby comprising a generally non-cylindrical portion 145 and a second portion 150 that, in combination, define an external contoured surface 155 between the generally non-cylindrical portion 145 and the body 105.

Figure 11A:
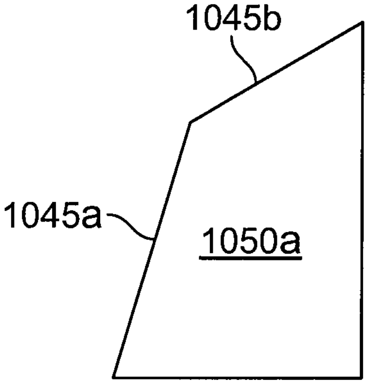
FIG. 11A-E are illustrations of various embodiments of the method of manufacturing a nozzle.
Figure 11B:
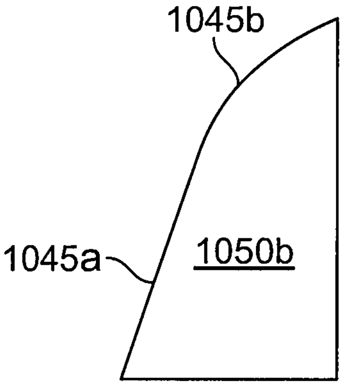
Figure 11C:
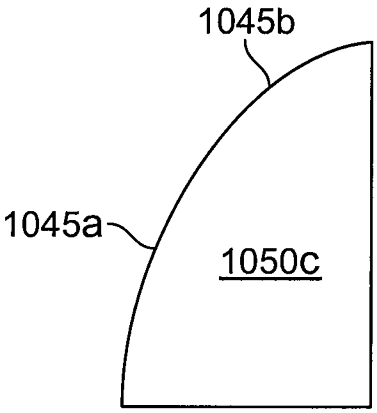
Figure 11D:
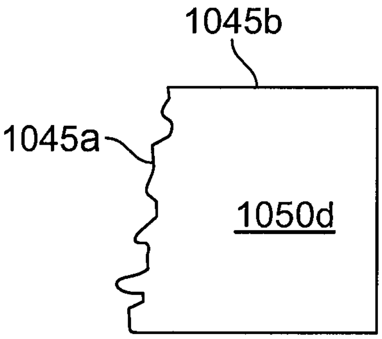
Figure 11E:
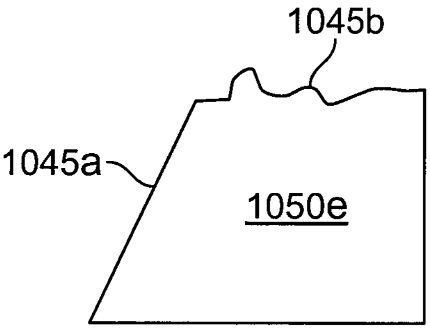

FIG. 11A-D are illustrations of various exemplary embodiments of section 1050. As depicted in FIG. 11A, section 1050*a,* corresponding to section 1150 in FIG. 10, can include a first sidewall 1145*a* that is substantially linear, and a second sidewall 1045*b* that is substantially linear. As illustrated in FIG. 11B, section 1050*b* can include a first sidewall 1145*a* that is substantially linear, and a second sidewall 1045*b* that is substantially nonlinear. Referring to FIG. 11C, section 1050*c* can have a larger cross-sectional area than 1050*a,* and can have a substantially nonlinear first sidewall 1045*b* and second sidewall 1050*b*. As depicted in FIG. 11D, section 1050*d* can have an irregular first sidewall 1045*a* and a linear second sidewall 1050*b*. Referring to FIG. 11E, section 1050*e* can have a linear first sidewall 1045*a* and an irregular second sidewall 1050*b*. Some embodiments include various combinations of linear, regular, and/or irregular sidewalls (e.g., 1045*a* and 1050*b*).

Referring to FIG. 10, the method comprises a step of providing a nozzle (e.g., 100) having an at least substantially cylindrical body (e.g., 105) and an at least substantially cylindrical nozzle head (e.g., 1025) disposed about a central longitudinal axis (e.g., 135). The method also comprises a step 1320 of removing a section (e.g., 1050) of the nozzle head to define a shoulder portion (e.g., 140) between an end face (e.g., 215) of the nozzle head and the body, the shoulder portion produced thereby comprising a generally non-cylindrical portion (e.g., 145) and a second portion (e.g., 150) that, in combination, define an external contoured surface (e.g., 155) between the generally non-cylindrical portion and the body.

Still referring to FIG. 10, the method can include at least some optional steps. In some embodiments, the method includes a step of establishing a region of minimum thickness (e.g., 165) between the generally non-cylindrical portion and the second portion such that the shoulder region has a contour line (e.g., 200) that identifies the region of minimum shoulder thickness. The method can include a step of establishing the contour line nearer the longitudinal axis than an inside diameter (e.g., 117) of the body.

Still referring to FIG. 10, the method can include a step of during the removing step, defining the generally non-cylindrical portion and second portion such that a second angle (e.g., $\phi$2) measured between the longitudinal axis and a second tangent line (e.g., 370) to a second exterior surface (e.g., 400) of the second portion is greater than a first angle (e.g., $\phi$1) measured between the longitudinal axis and a first tangent line (e.g., 365) to a first exterior surface (e.g., 395) of the generally non-cylindrical portion. In some embodiments, the method includes a step of disposing the second portion between the generally non-cylindrical portion and a reference point (e.g., 425) located by extending the first tangent line to an exterior surface (e.g., 107) of the nozzle body. In addition, the method can include a step of defining the second angle to be approximately 90 degrees. In some embodiments, the method includes a step wherein the generally non-cylindrical portion and the second portion are substantially conical.

While the invention has been particularly shown and described with reference to specific preferred embodiments, it should be understood by those skilled in the art that various changes in form and detail can be made therein without departing from the spirit and scope of the invention as defined by the appended claims.

What is claimed is:

1. A nozzle for a gas-cooled plasma arc cutting torch, the nozzle comprising:
- a body comprising a hollow interior having a cylindrical portion that defines a central longitudinal axis and an inside diameter; and
- a nozzle head defining:
  - a plasma exit orifice disposed about the central longitudinal axis;
  - a shoulder portion comprising a generally non-cylindrical portion and a second portion that, in combination, define an external contoured surface, the second portion disposed between the generally non-cylindrical portion and the body, and
  - a region of a minimum cross-sectional thickness between the generally non-cylindrical portion and the second portion.

2. The nozzle of claim 1, wherein a contour line defined by the external contoured surface correlates to the region of the minimum cross-sectional thickness.

3. The nozzle of claim 2, wherein the second portion is disposed between the contour line and a second region on the body that correlates to the intersection of the body and the shoulder portion.

4. The nozzle of claim 2, wherein the contour line is disposed between the generally non-cylindrical portion and the second portion.

5. The nozzle of claim 1, wherein the generally non-cylindrical portion is disposed nearer the longitudinal axis than is the inside diameter of the body.

6. The nozzle of claim 1, wherein substantially all of the generally non-cylindrical portion is between an end face of the nozzle head and a point on the nozzle body that corresponds to an insert depth of the electrode.

7. The nozzle of claim 1, wherein substantially all of the generally non-cylindrical portion is between an end face of the nozzle head and a bottom interior surface of the nozzle head.

8. The nozzle of claim 2, wherein a second angle measured between the longitudinal axis and a second tangent line to a second exterior surface of the second portion is greater than a first angle measured between the longitudinal axis and a first tangent line to a first exterior surface of the generally non-cylindrical portion.

9. The nozzle of claim 8, wherein the second portion is disposed between the generally non-cylindrical portion and a reference point located by extending the first tangent line to an exterior surface of the nozzle body.

10. The nozzle of claim 8, wherein the second tangent line passes through the second portion at a point of the nozzle head furthest from the longitudinal axis.

11. The nozzle of claim 8, wherein the second angle is approximately 90 degrees.

12. The nozzle of claim 1, wherein the region of minimum cross-sectional thickness corresponds to a heat transfer density proportionate to not more than about 2 amperes of torch operating current per square millimeter of nozzle cross-sectional conduction area at the region of minimum thickness.

13. The nozzle of claim 1, wherein the generally non-cylindrical portion is at least substantially conical.

14. The nozzle of claim 1, wherein the second portion is at least substantially conical.

15. The nozzle of claim 1, wherein the external contoured surface of the shoulder portion defines at least one of a non-linear or irregular surface.

16. The nozzle of claim 2, wherein the contour line is between the generally non-cylindrical portion and a point on the nozzle body that corresponds to an insert depth of the electrode.

17. The nozzle of claim 2, wherein the contour line is disposed between the generally non-cylindrical portion and a bottom interior surface of the nozzle head.

18. The nozzle of claim 1, wherein the generally non-cylindrical portion and the second portion are at least substantially contiguous.

19. The nozzle of claim 8, wherein the second tangent line substantially parallels the second exterior surface.

20. The nozzle of claim 8, wherein the first tangent line substantially parallels the first exterior surface.

21. A nozzle for a gas-cooled plasma arc cutting torch, the nozzle comprising:
- a body comprising a hollow interior having a cylindrical portion that defines a central longitudinal axis, an inside diameter, and an external body surface; and
- a nozzle head defining:
  - a plasma exit orifice disposed about the central longitudinal axis;
  - a shoulder portion defining an external contoured surface, wherein the shoulder portion has a first section and a second section disposed within a cross section of the shoulder portion that passes through the central longitudinal axis, the first section having a first external contour disposed between an end face of the nozzle head and an external surface of the nozzle body, the second section having a second external contour disposed between the external surface of the nozzle body and the first external contour, such that an angle $\phi$1 measured between the central longitudinal axis and a first tangent line to a first point on the first external contour is less than an angle $\phi$2 measured between the central longitudinal axis and a second tangent line to a second point on the second shoulder contour; and a region of a minimum cross-sectional thickness between the first external contour and the second external contour.

22. The nozzle of claim 21, wherein a contour point correlates to the region of the minimum cross-sectional thickness.

23. The nozzle of claim 22, wherein the contour point is disposed between the first external contour and a second region on the body that correlates to the intersection of the body and the shoulder portion.

24. The nozzle of claim 21, wherein the external contoured surface of the shoulder defines a nonlinear or irregular surface.

25. The nozzle of claim 21, wherein the second tangent line passes through the second section at a point of the nozzle head furthest from the longitudinal axis.

26. The nozzle of claim 21, wherein $\phi 2$ is approximately 90 degrees.

27. The nozzle of claim 21, wherein the first and second sections of the shoulder are at least substantially conical.

28. The nozzle of claim 21, wherein the first and second sections are at least substantially contiguous.

29. The nozzle of claim 21, wherein the first tangent line substantially parallels the first external contour.

30. The nozzle of claim 21, wherein the second tangent line substantially parallels the second external contour.

31. A nozzle for a gas-cooled plasma arc cutting torch, the nozzle comprising:

a body comprising a hollow interior having a cylindrical portion that defines a central longitudinal axis and an inside diameter; and a nozzle head defining:

a plasma exit orifice disposed about the central longitudinal axis;

a shoulder portion between an end face of the nozzle head and the body, the shoulder portion comprising an at least substantially frusto-conical portion and a flared portion that, in combination, define an external contoured surface of the shoulder portion, at least a portion of the frusto-conical portion disposed between an end face of the nozzle head and the flared portion, the flared portion disposed between the nozzle body and the frusto-conical portion; and a region of minimum cross-sectional thickness disposed within the flared portion.

32. The nozzle of claim 31 further comprising a contour line disposed on the external contoured surface that identifies the region of the minimum cross-sectional thickness.

33. The nozzle of claim 32, wherein the contour line is disposed at the intersection of the frusto-conical portion and the flared portion.

34. The nozzle of claim 32, wherein the contour line is disposed between the end face of the nozzle head and a point on the nozzle body that corresponds to an insert depth of the electrode.

35. The nozzle of claim 31, wherein an exterior surface of the flared portion forms a substantial portion of the external contoured surface.

36. The nozzle of claim 31, wherein the external contoured surface of the shoulder portion includes at least one of an irregular or non-linear cross-sectional shape.

37. The nozzle of claim 32, wherein a second angle measured between the central longitudinal axis and a second tangent line to an outermost exterior surface of the nozzle head is greater than a first angle measured between the central longitudinal axis and a first tangent line to a point on the shoulder that corresponds to the contour line.

38. The nozzle of claim 32, wherein the region of minimum cross-sectional thickness corresponds to a heat transfer density proportionate to not more than about 2 amperes of torch operating current per square millimeter of nozzle cross-sectional conduction area at the region of minimum cross-sectional thickness.

39. The nozzle of claim 37, wherein the contour line is disposed nearer the longitudinal axis than is the inside diameter of the body.

40. The nozzle of claim 37, wherein the second angle is approximately 90 degrees.

41. The nozzle of claim 31, wherein the flared portion is at least substantially conical.

42. The nozzle of claim 37, wherein the second tangent line substantially parallels the outermost exterior surface of the nozzle head.

43. The nozzle of claim 37, wherein the first tangent line substantially parallels a first exterior surface of the shoulder.

44. A torch tip comprising:

a nozzle comprising:

a nozzle body comprising a hollow interior having a cylindrical portion that defines a central longitudinal axis and an inside diameter; and a nozzle head defining:

a plasma exit orifice disposed about the central longitudinal axis; and a nozzle shoulder portion comprising a first generally non-cylindrical portion and a second nozzle portion that, in combination, define an external contoured surface, the second nozzle portion disposed between the first generally non-cylindrical shoulder portion and the nozzle body;

a region of minimum cross-sectional thickness between the first generally non-cylindrical portion and the second nozzle portion; and a shield comprising:

a shield body including a fastener for securing the shield to the torch body in a spaced relationship relative to the nozzle, for routing a shield gas through a space between the shield body and the nozzle; and a shield head defining:

a shield exit orifice disposed about the central longitudinal axis; and a shield shoulder portion comprising a second generally non-cylindrical portion and a second shield portion that, in combination, define an internal contoured surface, the second shield portion disposed between the second generally non-cylindrical portion and the body, the second generally non-cylindrical and second shield portions corresponding to the first generally non-cylindrical and second nozzle portions.

45. The torch tip of claim 44, wherein a second angle measured between the longitudinal axis and a second tangent line to a second external surface of the second nozzle portion is greater than a first angle measured between the longitudinal axis and a first tangent line to a first external surface of the first generally non-cylindrical portion.

46. The torch tip of claim 44, wherein the second angle is approximately 90 degrees.

47. The torch tip of claim 45, wherein the first generally non-cylindrical portion and the second nozzle portion are substantially conical.

48. The torch tip of claim 44, wherein the generally non-cylindrical portion and the second nozzle portion are at least substantially contiguous.

49. The torch tip of claim 45, wherein the second tangent line at least substantially parallels the second external surface.

50. The torch tip of claim 45, wherein the first tangent line at least substantially parallels the first external surface.

51. A gas-cooled plasma arc torch comprising the torch tip of claim 44.

52. A method for increasing the life of a nozzle, the method comprising:

providing a nozzle having a body and a nozzle head, the nozzle head defining an at least substantially frusto-conical shoulder portion such that a first nozzle wear rate results; and defining the nozzle of claim 1 further comprising a flared shoulder portion that, in combination with the at least substantially frusto-conical shoulder portion, defines a nozzle shoulder defining the external contoured surface, at least a portion of the frusto-conical surface disposed between an end face of the nozzle head and the flared portion, the flared portion disposed between the body and the frusto-conical portion, such that a second nozzle wear rate results, the second nozzle wear rate less than the first nozzle wear rate.

53. The method of claim 52, further comprising the step of:

forming the flared shoulder portion such that a second angle measured between the central longitudinal axis and a second tangent line to an outermost exterior surface of the nozzle head is greater than a first angle measured between the central longitudinal axis and a first tangent line to a point on the shoulder that corresponds to the contour line.

54. The torch tip of claim 52, further comprising the step of:

establishing a contour line on the contoured surface that correlates to the region of the minimum shoulder thickness between the generally non-cylindrical portion and the second portion.

55. The method of claim 53, further comprising the step of:

defining the second angle to be approximately 90 degrees.

56. The method of claim 54, further comprising the step of:

positioning the contour line to be at the intersection of the frusto-conical portion and the flared portion.

57. The method of claim 54, further comprising the step of:

disposing the contour line nearer the longitudinal axis than an inside diameter of the body.

58. The method of claim 52, further comprising the step of:

defining the external contoured surface with an irregular or non-linear cross-sectional shape.

59. The method of claim 52, further comprising the step of:

defining the flared portion as substantially conical.

60. The method of claim 58, further comprising the step of:

establishing the region of minimum shoulder thickness to with at least a minimum thickness to correspond to a heat transfer density proportionate to not more than about 2 amperes of torch operating current per square millimeter of nozzle cross-sectional conduction area at the region of minimum shoulder thickness.

* * * * *

UNITED STATES PATENT AND TRADEMARK OFFICE

CERTIFICATE OF CORRECTION

PATENT NO. : 8,513,565 B2
APPLICATION NO. : 12/101086
DATED : August 20, 2013
INVENTOR(S) : Zheng Duan It is certified that error appears in the above-identified patent and that said Letters Patent is hereby corrected as shown below:

In the Claims:

In claim 60, at column 20, line 24, amend "The method of claim 58" to --The method of claim 54--.

Signed and Sealed this
First Day of October, 2013

Teresa Stanek Rea
*Deputy Director of the United States Patent and Trademark Office*